(12) United States Patent
Peng

(10) Patent No.: US 7,604,355 B1
(45) Date of Patent: Oct. 20, 2009

(54) SYSTEMS AND METHODS FOR HANDHELD PROJECTION DISPLAYS

(75) Inventor: Song Peng, Pleasanton, CA (US)

(73) Assignee: PhotonEdge Inc., Pleasanton, CA (US)

( * ) Notice: Subject to any disclaimer, the term of this patent is extended or adjusted under 35 U.S.C. 154(b) by 413 days.

(21) Appl. No.: 11/302,044

(22) Filed: Dec. 13, 2005

Related U.S. Application Data

(60) Provisional application No. 60/635,050, filed on Dec. 13, 2004.

(51) Int. Cl.
  G03B 29/00 (2006.01)
  G03B 21/20 (2006.01)
  G03B 21/14 (2006.01)
  G03B 21/28 (2006.01)
  H04N 5/74 (2006.01)
  G02F 1/135 (2006.01)
  G02F 1/1335 (2006.01)
  G02B 7/28 (2006.01)

(52) U.S. Cl. .......................... 353/43; 353/32; 353/102; 353/84; 353/81; 348/771; 349/30; 349/62; 349/57; 396/113

(58) Field of Classification Search .................. 353/32, 353/43, 42, 102, 84, 81; 348/800–801, 771; 349/61, 62, 69, 57, 30; 396/113
See application file for complete search history.

(56) References Cited

U.S. PATENT DOCUMENTS

| | | | |
|---|---|---|---|
| 6,227,669 B1 * | 5/2001 | Tiao et al. | 353/31 |
| 6,478,429 B1 * | 11/2002 | Aritake et al. | 353/31 |
| 6,533,420 B1 * | 3/2003 | Eichenlaub | 353/7 |
| 6,637,892 B1 * | 10/2003 | Okuyama et al. | 353/38 |
| 6,896,375 B2 * | 5/2005 | Peterson et al. | 353/66 |
| 7,216,986 B2 * | 5/2007 | Ikeda et al. | 353/33 |
| 2004/0070841 A1 * | 4/2004 | Bierhuizen | 359/641 |
| 2004/0156130 A1 * | 8/2004 | Powell et al. | 359/845 |

* cited by examiner

*Primary Examiner*—Diane I Lee
*Assistant Examiner*—Magda Cruz
(74) *Attorney, Agent, or Firm*—Intellectual Equity; Peter Su

(57) ABSTRACT

Systems and methods are described employing a first lens array and a second lens array that are separated by one focal length that receives a plurality of colors signals from an X-prism and transmits to a condenser for overlapping lenslet images onto a display panel, such as a LCOS or LCD display panel. The first lens array includes a plurality of lenslets where each lenslet in the first lens array corresponds with each lenslet in a plurality of lenslets in the second lens array. The lenslets can be either refractive, defractive, or a combination of refractive and defractive.

35 Claims, 15 Drawing Sheets

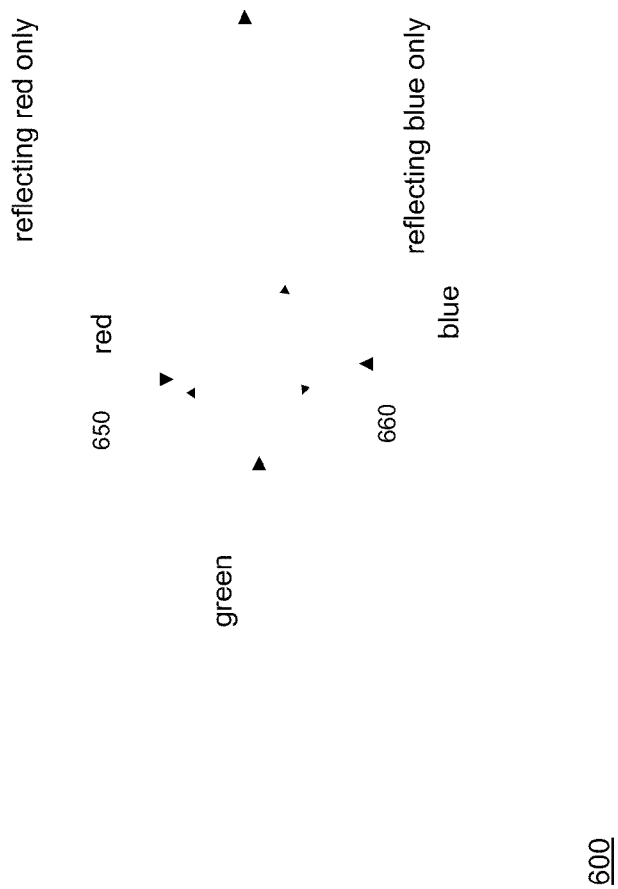

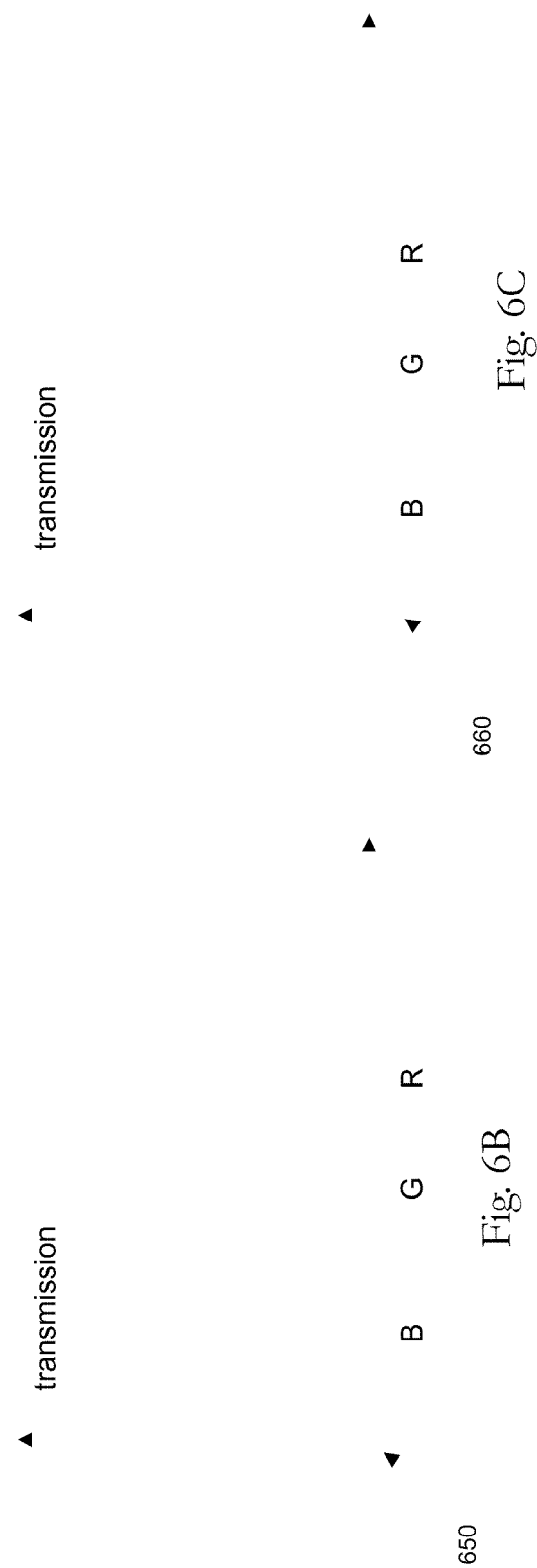

660
Reflect red, and transmit green and blue

650
Reflect blue, and transmit red and green

230

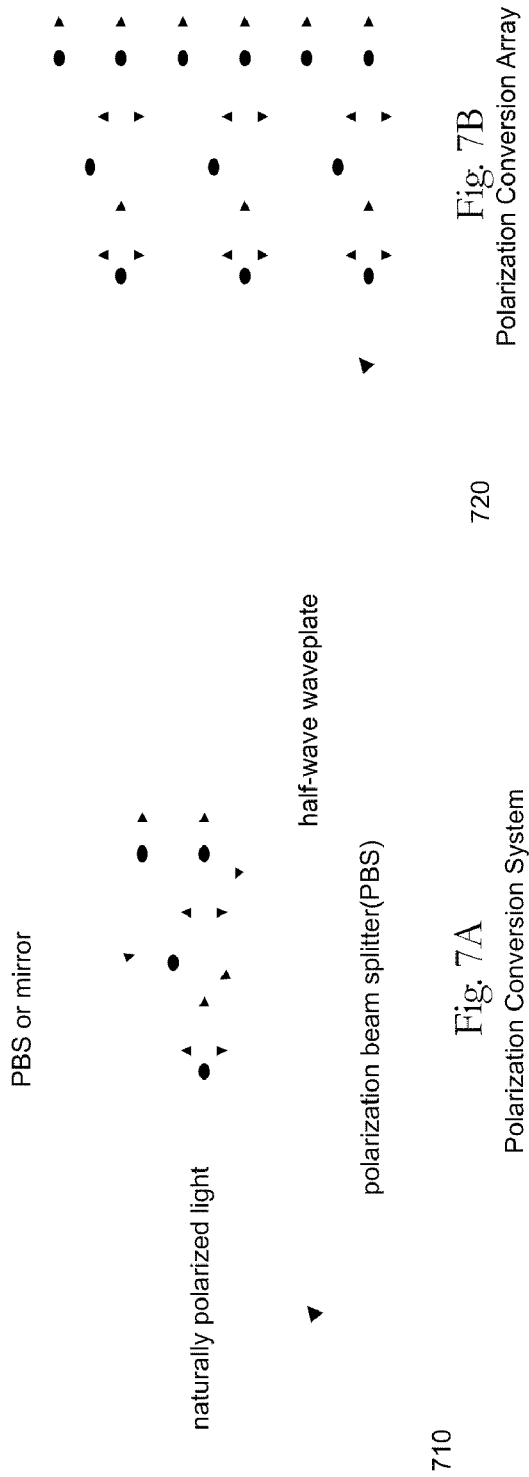

SYSTEMS AND METHODS FOR HANDHELD PROJECTION DISPLAYS

RELATED APPLICATION DATA

This application claims the benefit of U.S. Provisional Patent Application No. 60/635,050 entitled Head-Mount Display and Handheld Projection Displays, filed on 13 Dec. 2004, which is incorporated herein by reference.

BACKGROUND OF THE INVENTION

1. Field of the Invention

The present invention relates generally to displays and more particularly to handheld projection displays with a larger visual screen.

2. Description of Related Art

In the new world that is frequently characterized, metaphorically speaking, that the world is flat, a mobile computing device will be at the central platform in which an individual is tied to the computing universe, replacing a personal desktop computer, as information technology, electronic mails, the Internet, instant messaging, and global positioning systems, become increasingly 24/7 in one's daily live in working in a fluid society and an ever-integrated global economy. Current music players possess or exceed the processor power, memories, and storage memories of yester years mainframe computers already, but the fragmentation between a desktop computer and a mobile device remains distinct and non-converging primarily, and perhaps solely, rest on the practically impossibility of designing a handheld device that is sufficiently light weight for mobile professionals while simultaneously provides a sufficiently large screen that one can see to efficiently work in mundane computer applications like a word processing program or a spread sheet.

With wide-spread applications of digital media and ever increasing communication bandwidths, high-resolution and large-format displays are required for handheld devices such as cell phones, Personal Digital Assistants (PDAs), portable digital video players, and portable DVD players. Currently, the size of a display on these devices is limited by the dimension of the device itself. The fundamental conflict of increasing display size and decreasing device size can primarily be resolved by new display devices that decouple screen size and device size.

Accordingly, it is desirable to design handheld projection displays that are decoupled but operate in conjunction with a handheld computing device in order to generate a display sufficient in dimension to make the handheld computing device even more attractive to use.

SUMMARY OF THE INVENTION

The present invention describes handheld projection display systems and methods employing a first lens array and a second lens array that are separated by one focal length which receive a plurality of colors signals from an X-prism and transmit to a condenser for overlapping lenslet images onto a display panel, such as a Liquid Crystal on Silicon (LCOS) or Liquid Crystal Display (LCD) display panel. The first lens array includes a plurality of lenslets where each lenslet in the first lens array corresponds with each lenslet in a plurality of lenslets in the second lens array. The lenslets can be either refractive, defractive, or a combination of refractive and defractive.

In a first embodiment, a handheld projection system employing a first lens array and a second lens array for processing a plurality of color light signals where a single LCOS display panel spatially modulates the color light signals which forms an image onto a screen. In a second embodiment, a handheld projection system employing a first LCOS display panel for spatially modulating a S-polarization component onto a screen and a second LCOS display panel for spatially modulating a P-polarization component onto the screen. In a third embodiment, a handheld projection system employs a field lens positioned between a polarization beam splitter and a LCOS display panel that makes illumination telecentric, which simplifies the optics in a condenser as well as reducing the size of the condenser. In a fourth embodiment, a handheld projection system employing a separate set of a first lens array, a second lens array, and a condenser associated with each color light signal, producing an end product that is more compact in design. In a fifth embodiment, a handheld projection system employing a transmissive LCD display panel with the additions of a second polarizer and a folding mirror.

Broadly stated, a handheld display system, comprises one or more light sources for generating one or more color light signals; a first lens array having a plurality of lenslets; a second lens arrays having a plurality of lenslets, the second lens array spaced apart from the first lens array by one focal length between the plurality of lenslets of the second lens array and the plurality of lenslets of the first lens array; and a display panel for spatially modulates the one or more light signals to a projection lens that forms an image onto a screen.

The structures and methods regarding to the present invention are disclosed in the detailed description below. This summary does not purport to define the invention. The invention is defined by the claims. These and other embodiments, features, aspects, and advantages of the invention will become better understood with regard to the following description, appended claims and accompanying drawings.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1A:
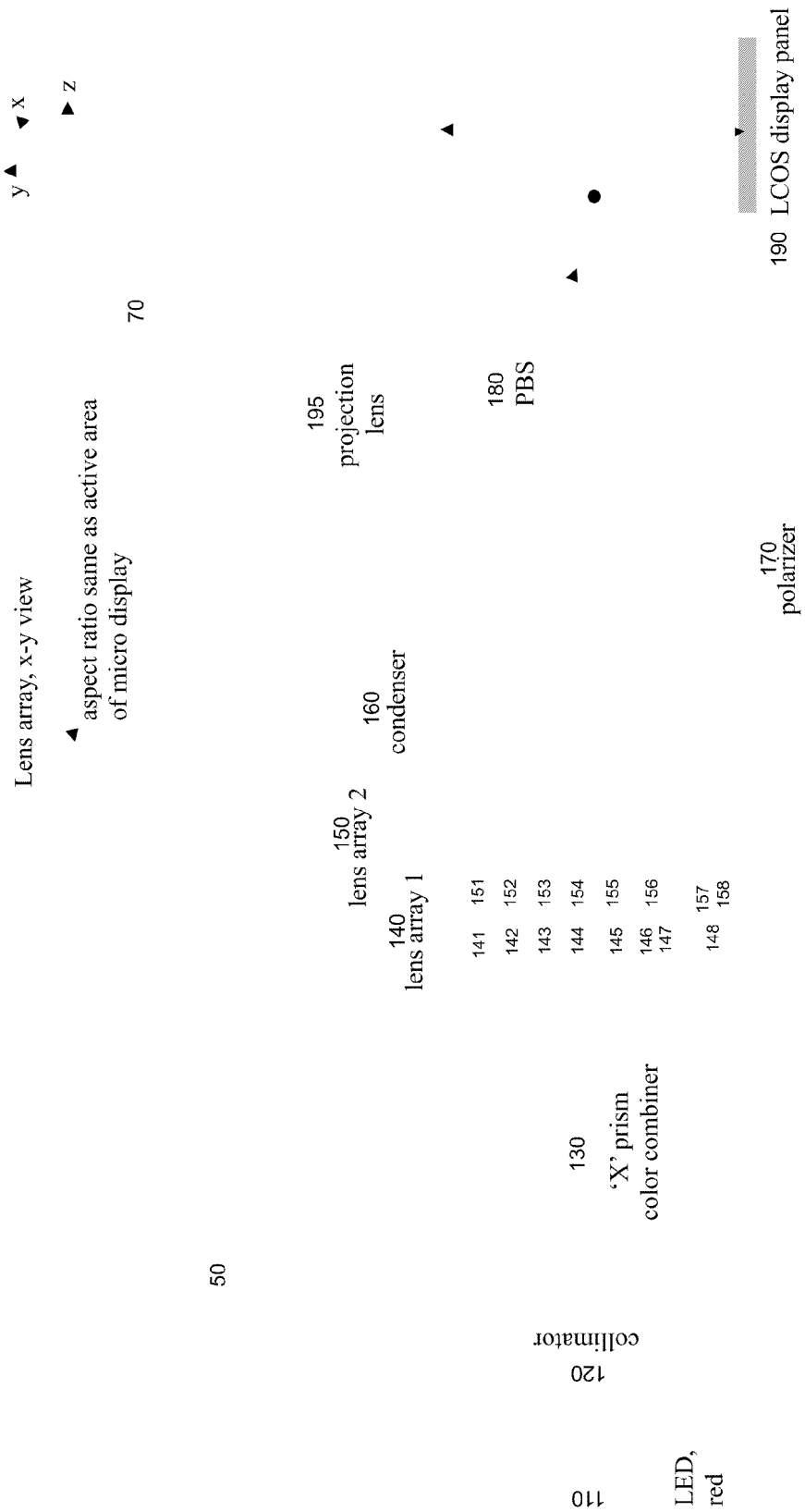
FIG. 1A illustrates a structural diagram of Y-Z view in a first embodiment of a handheld projection system employing a LCOS display panel in accordance with the present invention.

Referring now FIG. 1A, there is shown a structural diagram of Y-Z view in a first embodiment of a handheld projection system 100 employing a LCOS display panel 190. The term "LCOS display panel" is used interchangeably with "LCOS microdisplay", or referring to a LCOS chip. The handheld projection system 100 generally can be viewed as comprising two main sections: illumination optics 50 and projection optics 70. A light emitting diode (LED) 110 projects a light signal that is collimated by a collimator 120 into a relatively narrow diverging cone toward an X-prism color combiner 130 (also referring to as a prism plate color combiner). The light emitting diode 110 is of red color. The X-prism color combiner 130 transmits the red color light to a first lens array 140.

The first lens array 140 includes a plurality of lenslets in a two-dimensional array. Lenslet 141, 142, 143, 144, 145, 146, 147 and 148 are examples. A second lens array 150 includes a plurality of lenslets in a two-dimensional array. Lenslets 151, 152, 153, 154, 155, 156, 157 and 158 are examples. The number of required lenslets depends on the uniformity of the illumination on the lens array 140. Less uniform illumination requires larger number of lenslets. Each lenslet in the first lens array 140 and the second lens array 150 have the same or substantially the same focal length. The first lens array 140 and the second lens array 150 are separated by one focal length of the lenslets. Each lenslet in the first lens array 140 has a corresponding lenslet in the lenslet in the second lens array 150. The first lens array 140 focused incoming light signals to the second lens array 150. The lenslets in the first lens array 140 and the lenslets in the second lens array 150 can be either refractive or diffractive, or a combination of refractive and diffractive.

One or more condensers 160 receives light signals from the second lens array 150, and focusing the light signals and overlapping lenslet images toward a display panel 190, such as a LCOS chip. Other display panels such as MEMS spatial light modulator and digital light processor (DLP) panels may also be used. In one embodiment, the condenser 160 is designed to produce telecentric illumination at the display panel 190. An optional linear polarizer 170 receives a light signal from the one or more condensers 160 and passes the light signal with one linear polarization for illumination. A polarization beam splitter (PBS) 180 reflects the illumination light onto the LCOS display panel 190. The polarization beam splitter 180 can be implemented as a PBS cube, a PBS plate, or a wire-grid polarizer/PBS. The LCOS display panel 190 spatially modulates the polarization and reflects the light signal back to the polarization beam splitter 180. The polarization beam splitter 180 transmits just the P-polarization component of the light signal. One or more projection lens 195 projects images from the LCOS panel 290 onto a screen (not shown). The screen can be implemented in a wide variety material, such as a piece of paper, a piece of plastic board, a foldable screen, a wall, or any surface that is suitable for projecting an image.

Figure 1B:
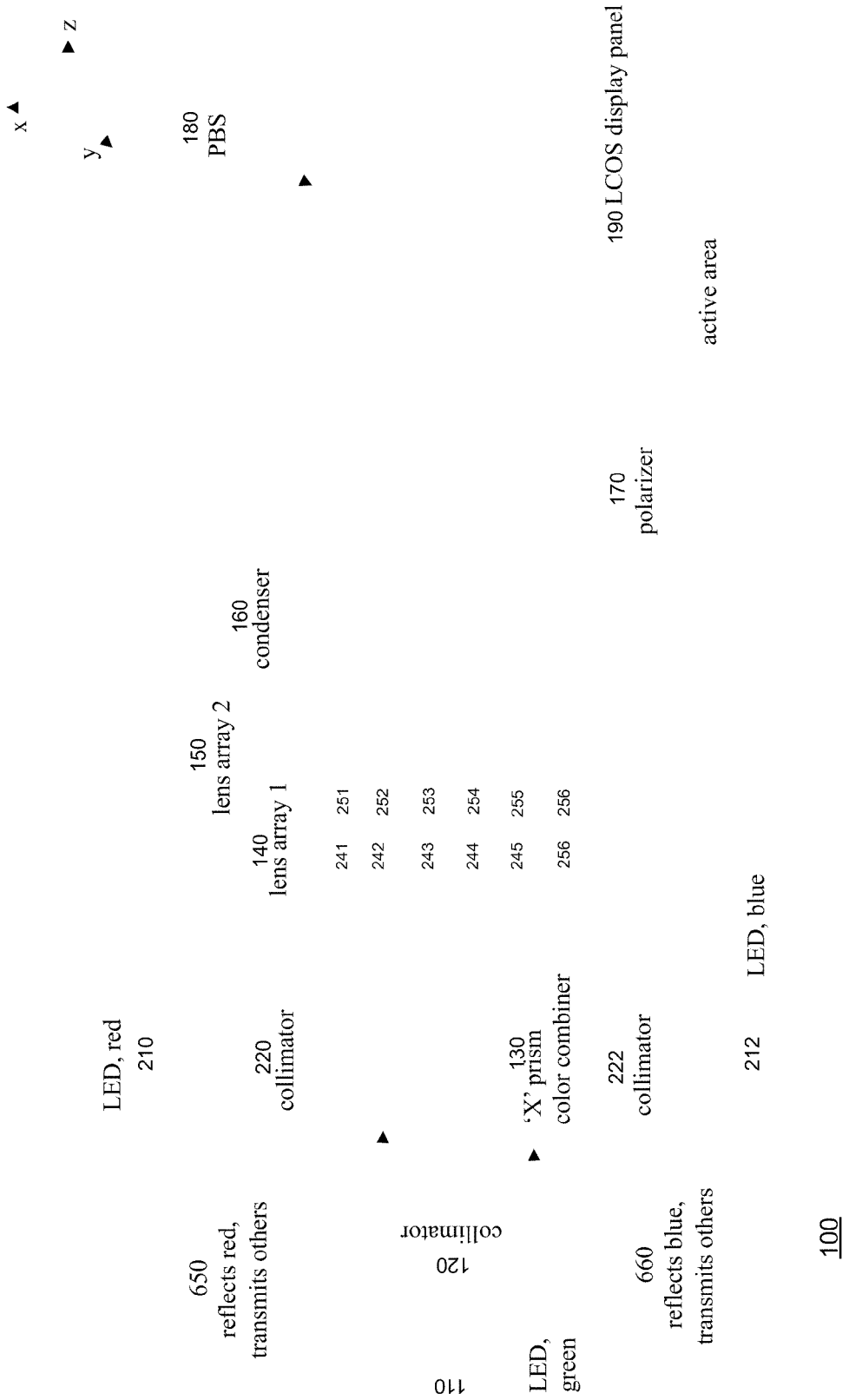
FIG. 1B illustrates a structural diagram of X-Z view in the first embodiment of a handheld projection system employing a LCOS display panel in accordance with the present invention.

As illustrated in FIG. 1B, there is shown a structural diagram of X-Z view in the first embodiment of a handheld projection system 100 employing a LCOS display panel. The handheld projection system 100 includes three light emitting diodes 110, 211, and 212 where each diode represents a prime color of red, green or blue, respectively. The red LED 210 projects a light signal that is collimated by optics, i.e. a collimator 220, into a relatively narrow diverging cone toward an X-prism color combiner 130. The green LED 110 projects a light signal that is collimated by a collimator 120, into a relatively narrow diverging cone toward the X-prism color combiner 130. The blue LED 212 projects a light signal that is collimated by a collimator 222, into a relatively narrow diverging cone toward the X-prism color combiner 130.

Figure 6D:
FIG. 6D illustrates a more elaborated pictorial diagram of the X-prism color combiner in accordance with the present invention.
Figure 6A:
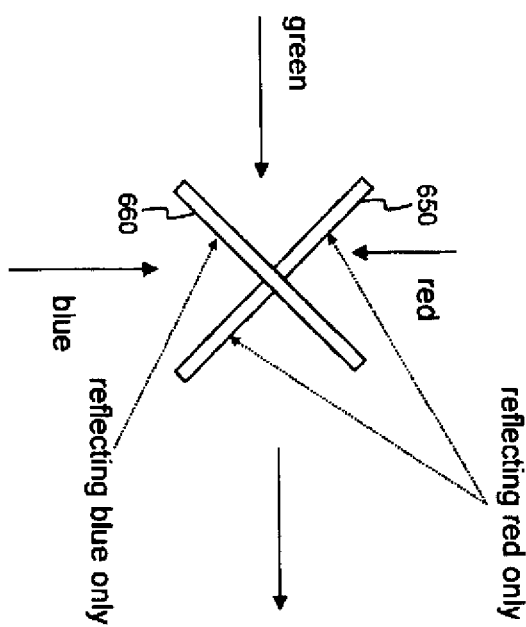
FIG. 6A illustrates a simplified pictorial diagram of an X-prism color combiner in accordance with the present invention.

The X-prism 130 coherently combines the three color signals, the light signal from the red LED 210, the light signal from the green LED 110, and the light signal from the blue LED 212. The X-prism color combiner 130 can be implemented in a wide variety of materials. The X-prism color combiner 130 can be implemented as a solid glass cube. The X-prism color combiner 130 can also be constructed with glass plates coated with dichroic color-separating thin films, as depicted in FIGS. 6A and 6D. One advantage of the plate construction embodiment is that it produces less weight compared to the solid glass construction.

Figures 6B, 6C:
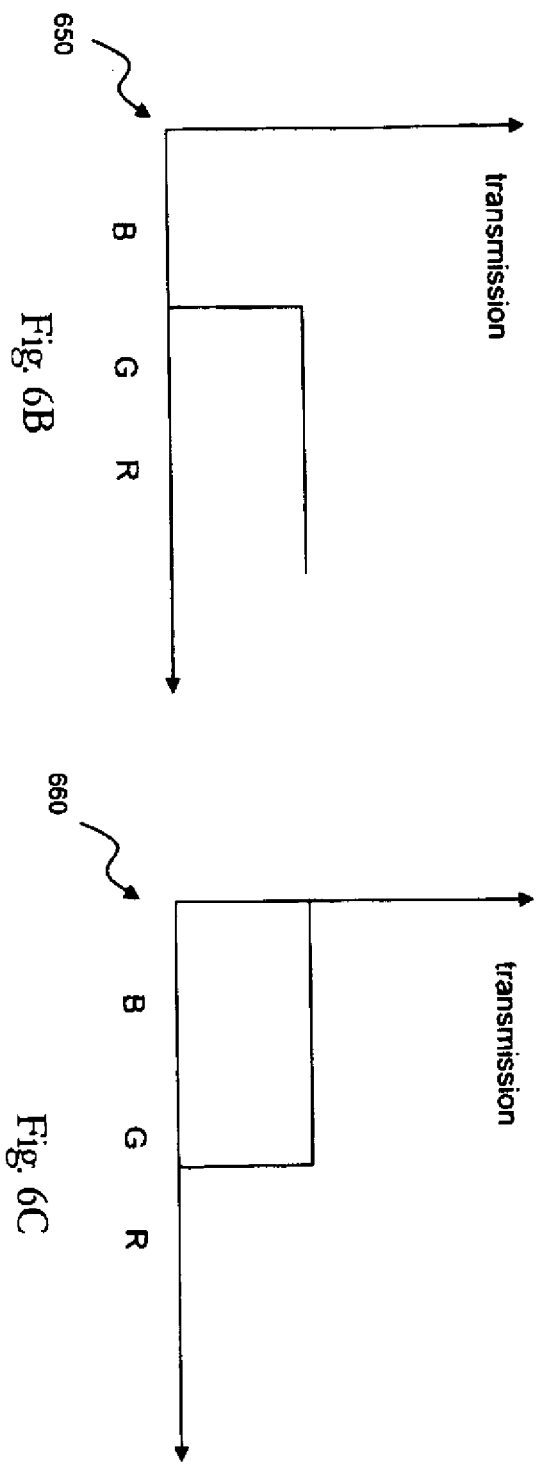
FIG. 6B illustrates a long-pass filter in the X-prism color combiner in accordance with the present invention.
FIG. 6C illustrates a short-pass filter in the X-prism color combiner in accordance with the present invention.
Figure 6D:
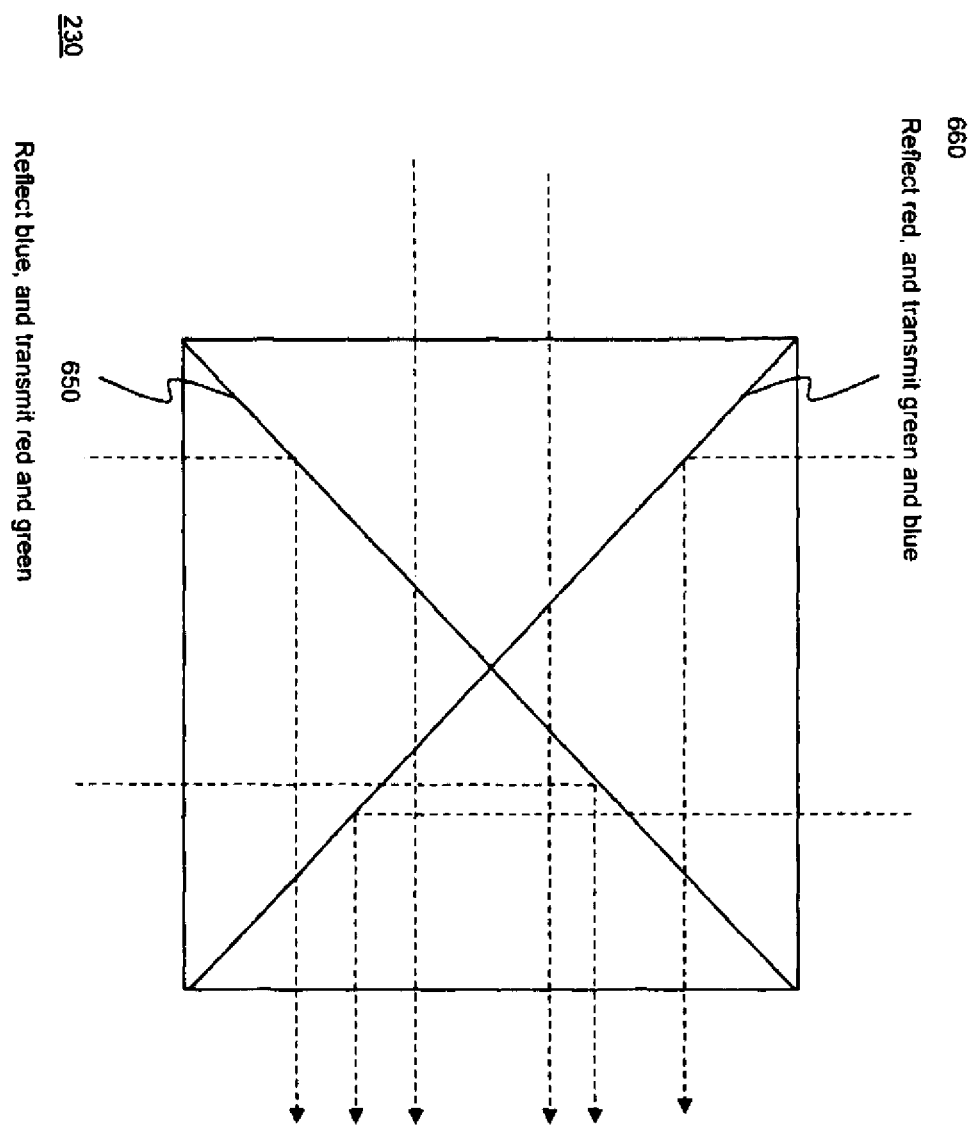

The X-prism color combiner 130 comprises a long-pass (or high-pass) filter 650 and a short-pass (or low-pass) filter 660 where both the long-pass filter 650 and the short-pass filter 660 are coated with dichroic thin film. The characteristics of the long-pass filter 650, as illustrated in FIG. 6B, is to reflect blue light while transmitting green and red light. The characteristics of the low-pass filter 660, as shown in FIG. 6C, is to transmit blue and green light while reflecting red light. The design of the X-prism color combiner 130 with the long-pass filter 650 and the low-pass filter 660 therefore results in all signals, including the red light signal from the red LED 210, the green light signal from the green LED 110, and the blue light signal from the blue LED 212, reaching a first lens array 140.

Each prime color proceeds from lens array 140 to the LCOS display panel 190 and then to the display screen as described in the description with respect to FIG. 1A above. Full color image is formed by lighting the blue, green, and red LEDs in a time sequence while displaying corresponding images on the display panel 190. This scheme is frequently referred to in the display industry as 'time sequencing'.

To increase image brightness, the time sequence may also include a time period in which all LEDs are lit up. The white frame can substantially increase image brightness at the expense of color fidelity.

A few design rules should be followed, as described below with respect to one embodiment, in order to achieve maximum light efficiency of the projector. These rules are applicable to all of the embodiments described in the present invention. The relevant parameters are defined as follows:

$\theta$ half angle of the diverging cone exiting the collimator $F\#_{lenslet}$ the F-number of the lenslet s width or height of the lenslet (if the lenslet is in a rectangular shape, which has a width or height; alternatively, the lenses can be implemented in a circular or other geometric shape)

D width or height of a light beam at the first lens array $f_{lenslet}$ focal length of the lenslet (for the first and second lens arrays)

$f_{condenser}$ focal length of the condenser

L width or height of the display panel $F\#_{display}$ the F-number of the display panel, representing the acceptance cone angle of the panel.

The term "F#" is frequently referred to in the optics field to means the ratio of the effective focal length to a diameter of a lens. The following three equations show the mathematical relationships of various parameters to satisfy the design rules. For a lenslet having a rectangular shape, the three equations are applied a first time to the width, and the three equations are applied a second time to the height.

To ensure the lenslet in the first lens array 140 can focus all or substantially all light onto the corresponding lenslet in the second array 150, the following relations should be satisfied, as represented in Eq. (1). The tangent $\theta$ is less than or equal to the value of 0.5 divided by the F-number of the lenslet.

$$\mathrm{Tan}(\theta) \leq 0.5/F\#_{lenslet} \qquad \mathrm{Eq.~(1)}$$

To ensure that the illumination pattern matches the display panel, the following relation should be satisfied, as represented in Eq. (2). The width or height of the lenslet is equal to the width or height of the display panel multiply by the focal length of the lenslet divided by the focal length of the condenser.

$$s = L * f_{lenslet}/f_{condenser} \qquad \mathrm{Eq.~(2)}$$

To ensure the illumination fall within the acceptance cone of the display panel, the following relation should be satisfied, as represented in Eq. (3). The focal length of the condenser divided by the width or height of the light beam at the lens array is greater than or equal to the F-number of the display panel.

$$f_{condenser}/D \geq F\#_{display} \qquad \mathrm{Eq.~(3)}$$

Although the first lens array 140 and the second lens array 150 have substantially the same focal length, other parameters such as aspherical profile and lenslet shape can be different. The surface profile of the lenslet in the first lens array 140 should be optimized so that the lenslets focus substantially all light to the corresponding lenslet in the second array 150. Light that spilled into adjacent lenslet in the second array should be minimized to achieve maximum light efficiency. The profile of the lenslet in the second array 150 should be optimized together with the condenser 160 to image the lenslet in the first lens array 140 onto the LCOS display panel 190.

The required lens profiles may be realized using refractive surface, diffractive surface, or a combination of both. Multi-order diffractive surfaces can handle three colors with high efficiency. A first-order diffractive surface is well suited for a single prime color.

Both lens arrays may be non-uniform, i.e. the lenslet pitch may not be the same across the lens array. This may be necessary to accommodate different incident angle across the beam.

Glass molding, plastic molding, polymer embossing, and photolithography may be used to produce the lens arrays. To further save space, the two lens array should be made on opposite surfaces of a single substrate.

In addition, two orthogonal cylindrical lens arrays can also be used in place of the two lens arrays 140 and 150 described above. The lens arrays 140 and 150 have rectangle windows where each lenslet has a spherical shape of lens. In cylindrical lens, each lenslet does not curve in all directions but rather curve only in one direction.

Figure 2:
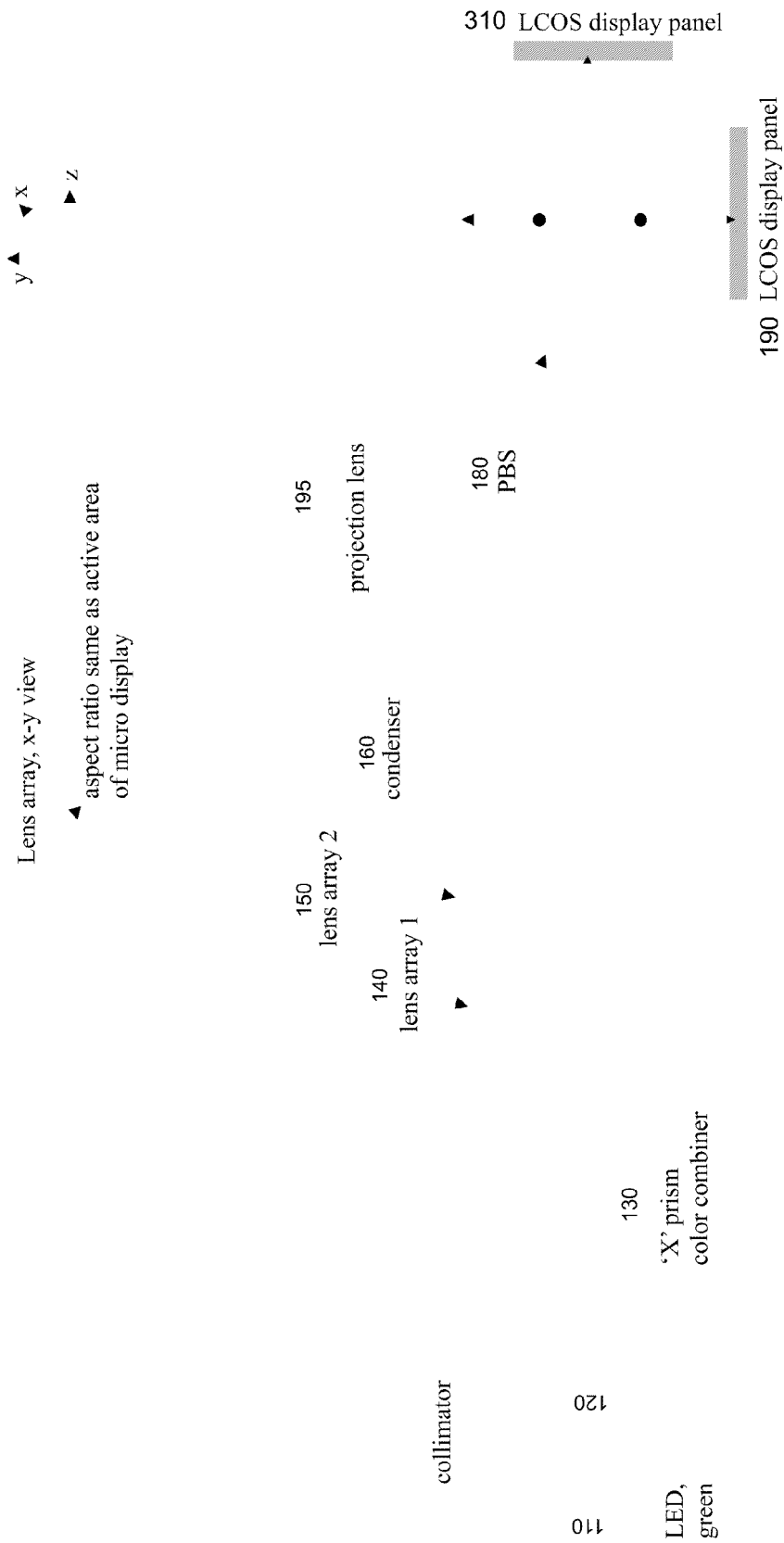
FIG. 2 illustrates a structural diagram in a second embodiment of a handheld projection system employing LCOS display panels in accordance with the present invention.
Figure 7A:
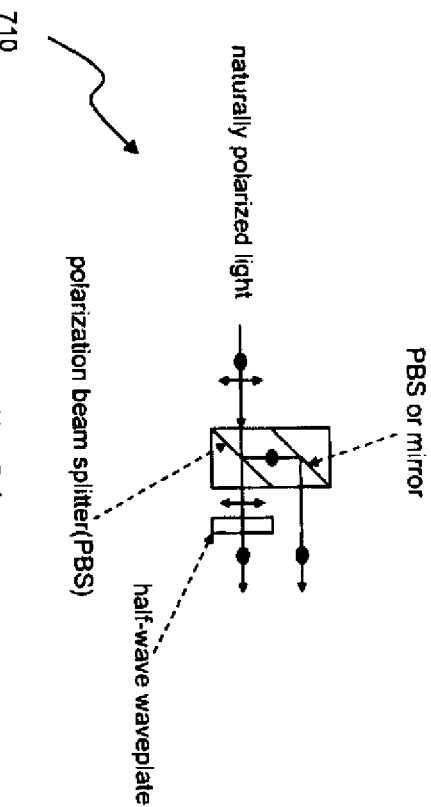
FIG. 7A is a structural diagram of a polarization conversion system for operation with a handheld projection system in accordance with the present invention.
Figure 7B:
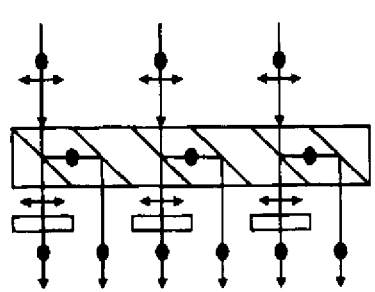
FIG. 7B is a structural diagram of a polarization conversion array for operation with a handheld projection system in accordance with the present invention.
Figure 8:
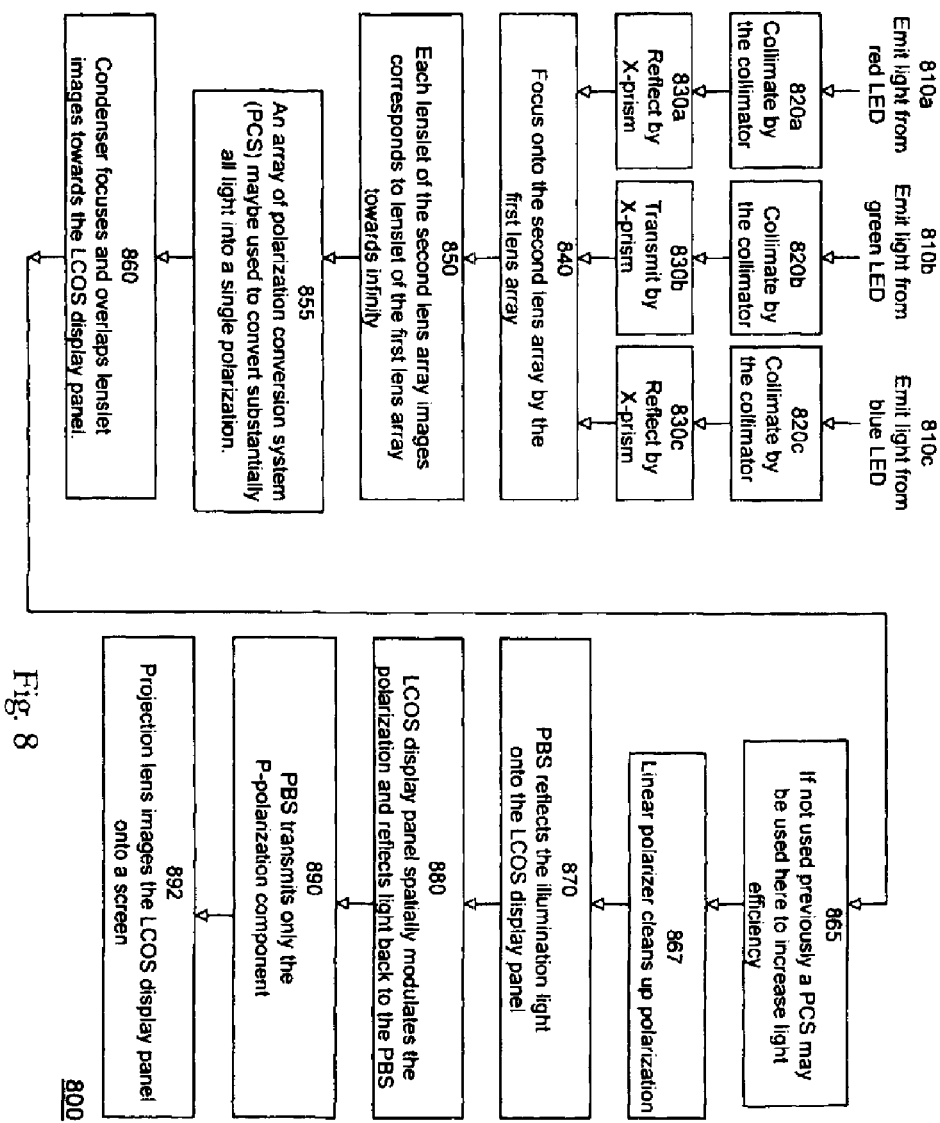
Figure 9:
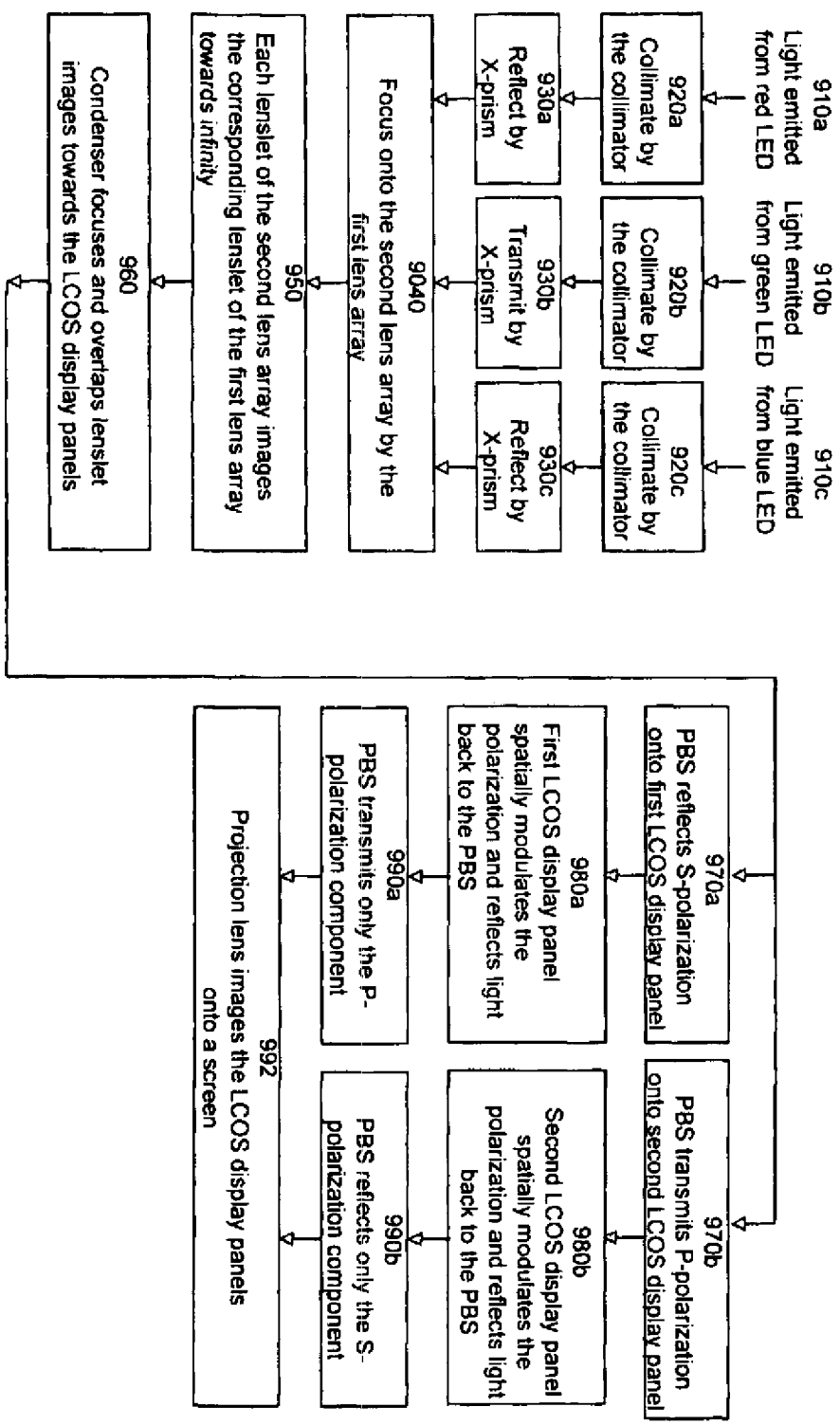
Figure 10:
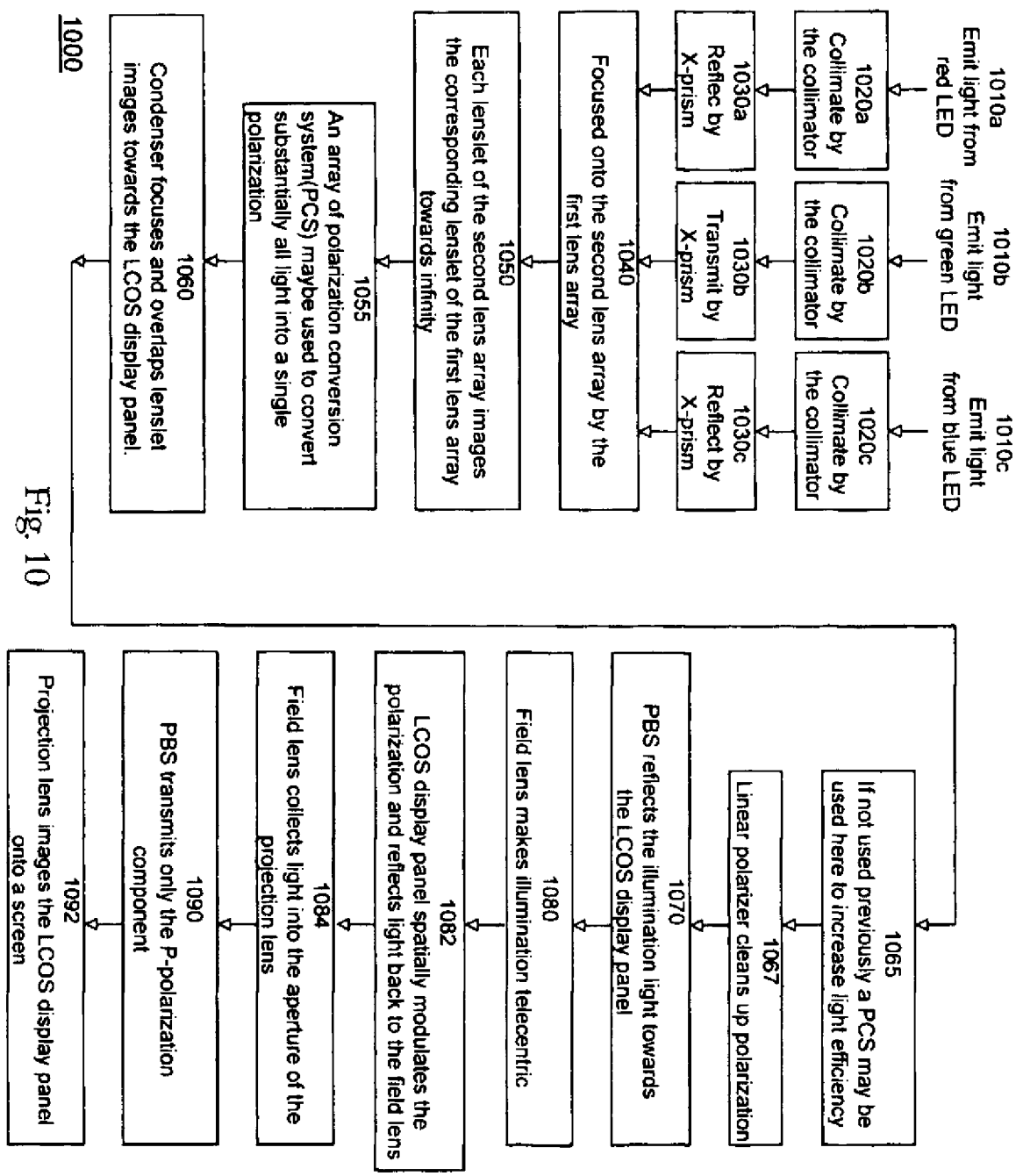
Figure 11:
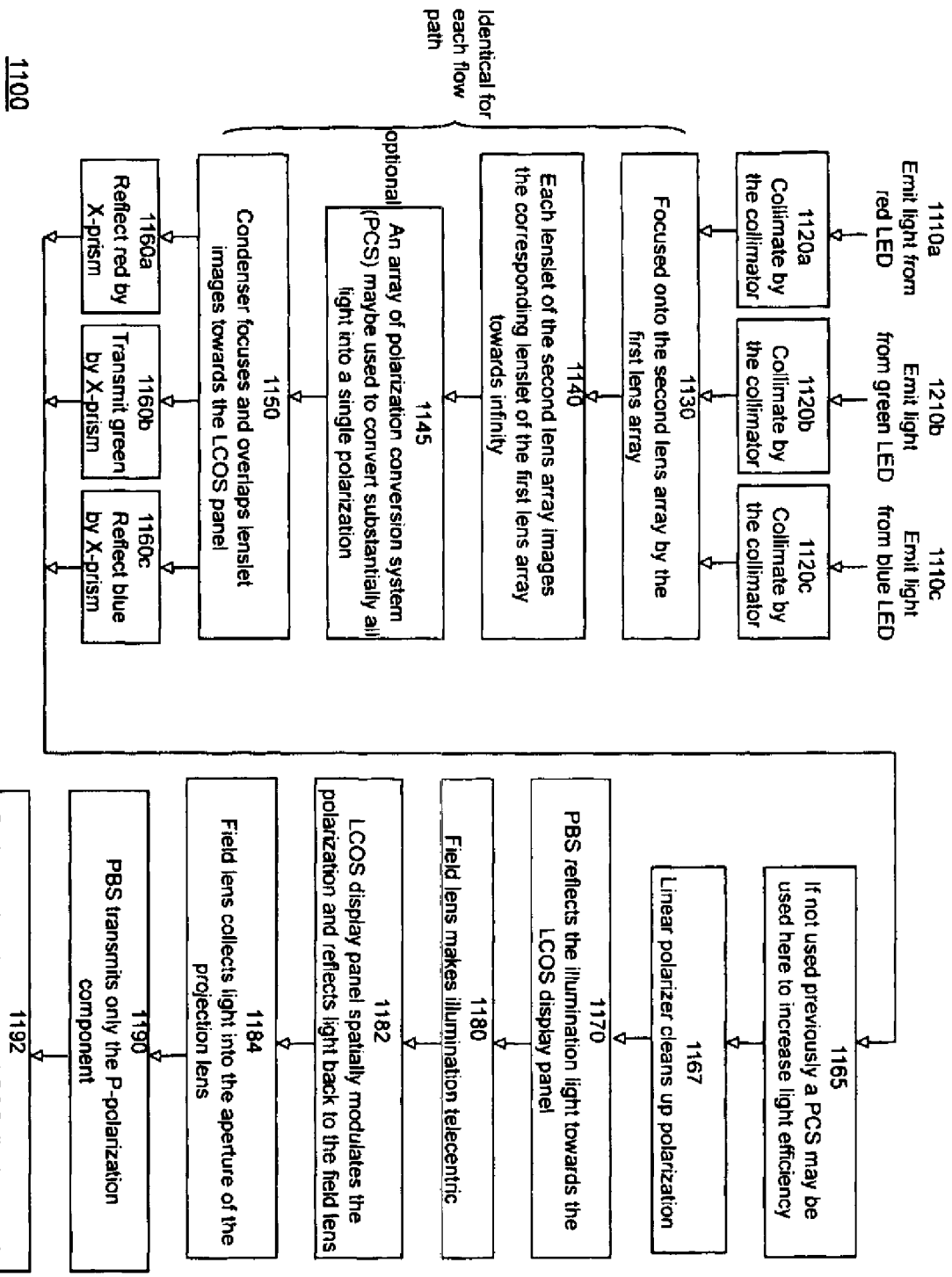
Figure 12:
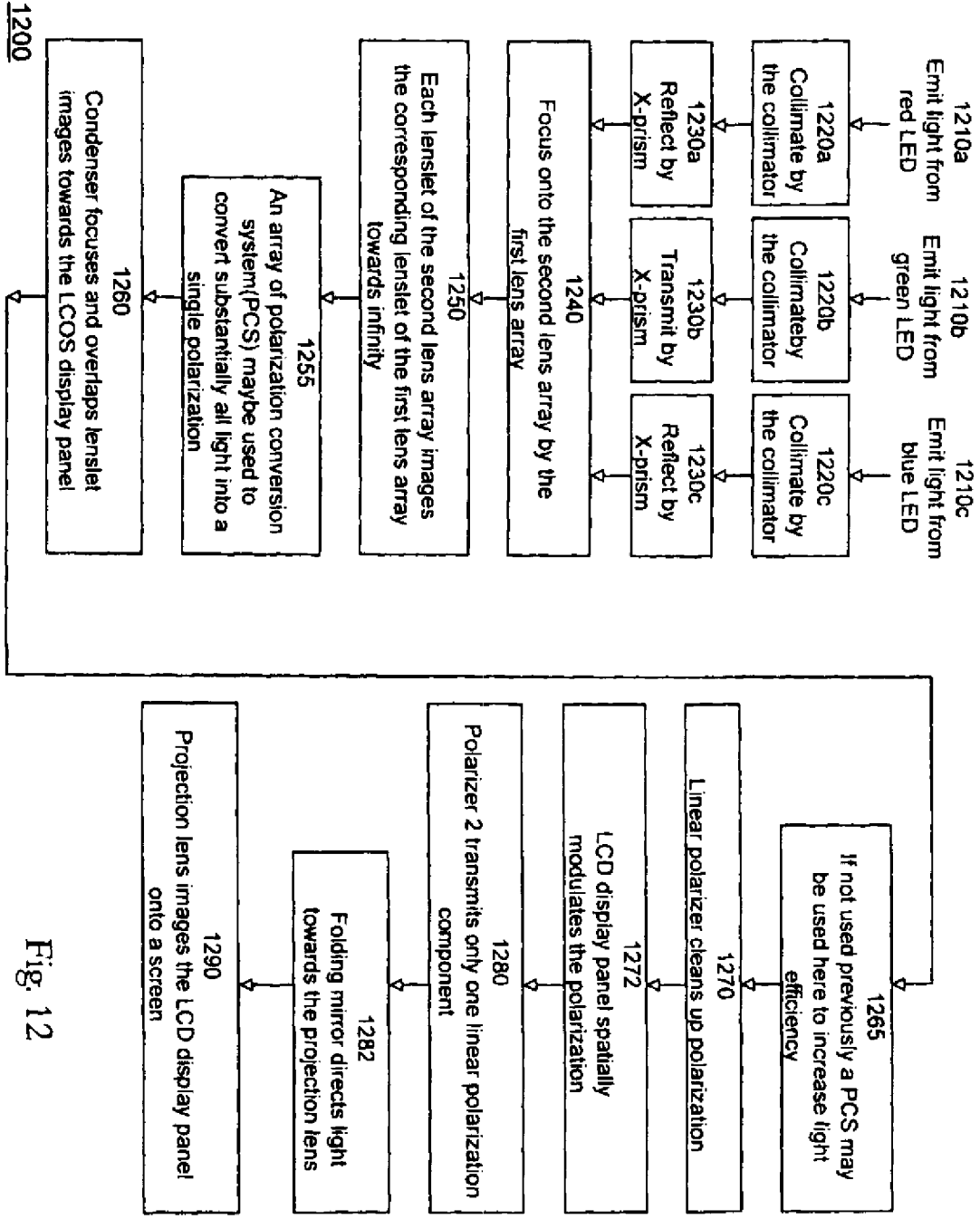

In FIG. 2, there is shown a structural diagram illustrating a second embodiment of a handheld projection system 200 employing a pair of LCOS display panels for recapturing the lost polarization. FIG. 2 is a Y-Z view in which the red and blue LEDs are not shown. As can be observed in FIGS. 1A and 1B, half of the light from the light source is lost if the light source is non-polarized. The handheld projection system 300 adds a second LCOS display panel 310 to recapture the lost polarization, thereby increasing the brightness of an image. In an alternative embodiment, a polarization converter can be used instead of the second LCOS display panel 310, when Etendue of the light source is less than the Etendue of the display panel. Etendue is typically the product of the source (or display) area and the solid angle of emitting cone (or acceptance cone of the display panel). A polarization conversion system as illustrated in FIG. 7A can be inserted between the condenser and the PBS to increase illumination efficiency. Alternatively, a polarization conversion array as shown in FIG. 7B may be inserted immediately after the second lens array. In this case each row of lenslet will be aligned with each row of polarization conversion system.

Figure 3:
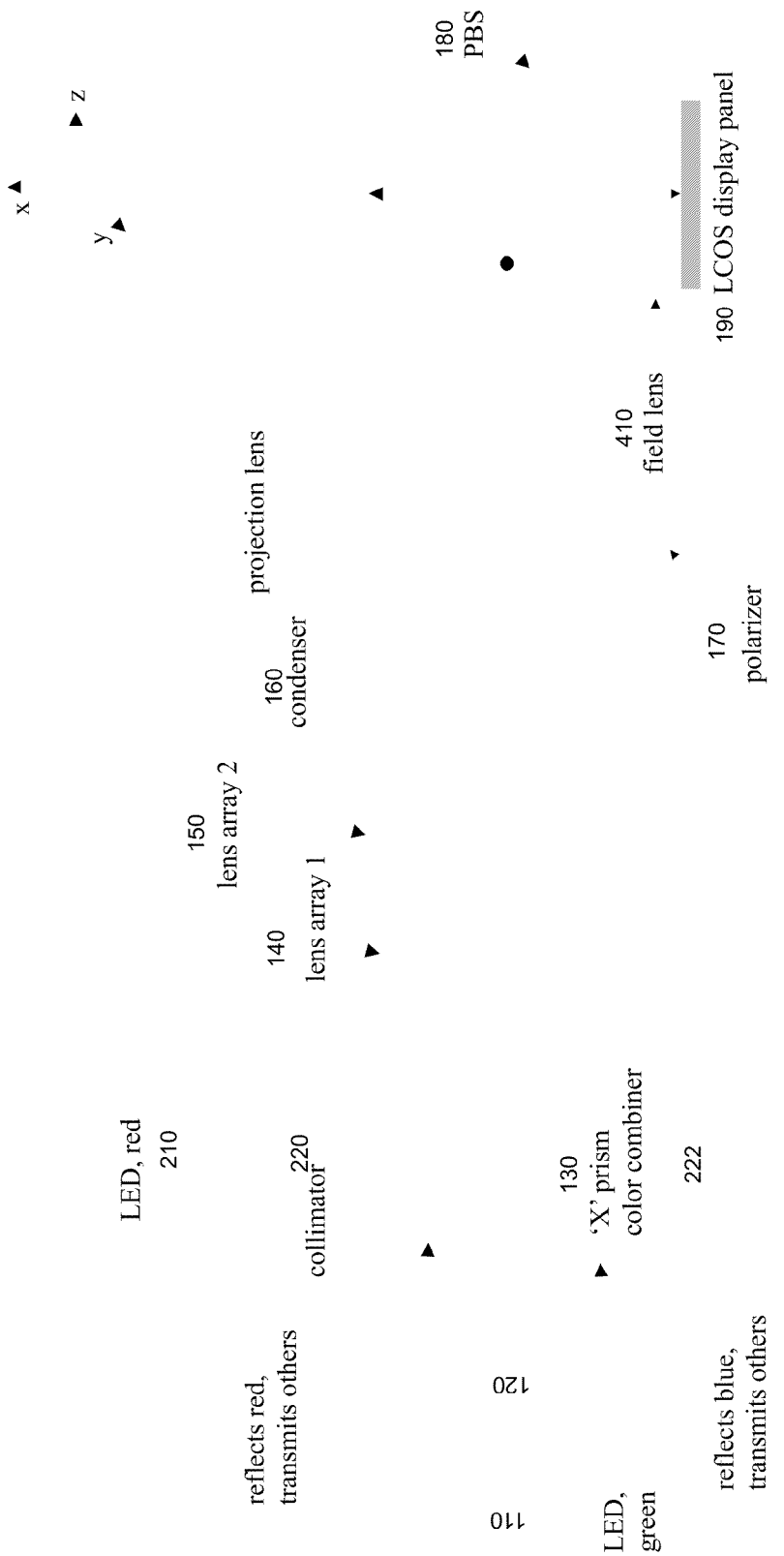
FIG. 3 illustrates a structural diagram in a third embodiment of a handheld projection system employing a LCOS display panel with a field lens in accordance with the present invention.

As shown in FIG. 3, there is a structural diagram illustrating a third embodiment of a handheld projection system 300 employing a LCOS display panel with a field lens 410. The field lens 410 is placed between the polarization beam splitter 180 and the LCOS display panel 190, in close proximity to the display panel 190. The advantage of using the field lens 410 as shown is that it simplifies the optics in the condenser 160 as well as reducing the size of the condenser 160. In a first order approximation, the focal length of the field lens 410 should be equal to the focal length of the condenser 160.

Figure 4:
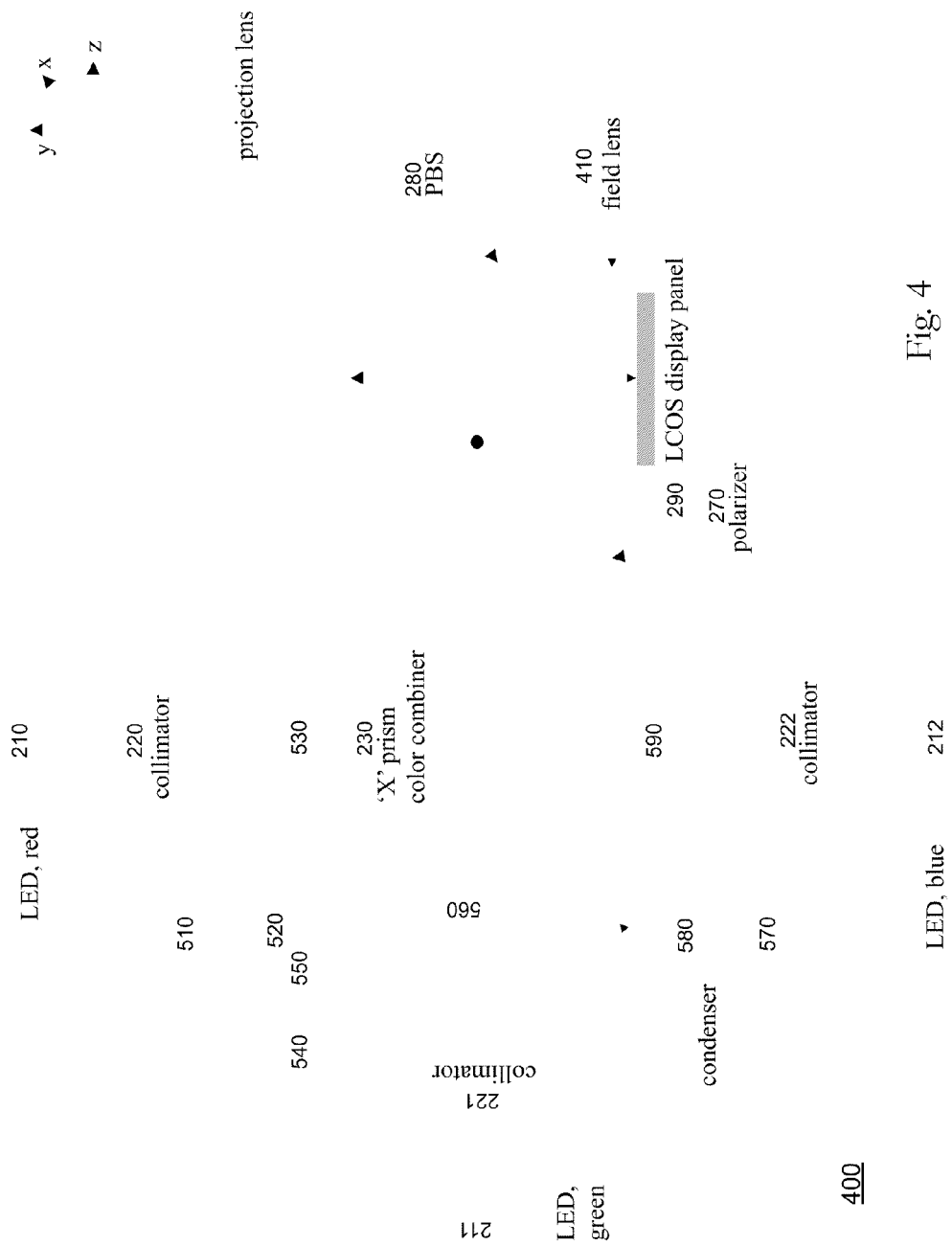
FIG. 4 illustrates a structural diagram in a fourth embodiment of a handheld projection system employing a LCOS display panel with a field lens in a more compact design in accordance with the present invention.

FIG. 4 illustrates a structural diagram in a fourth embodiment of a handheld projection system 400 employing LCOS display panels with a field lens in a more compact design. In this embodiment, each of the red LED 210, the green LED 211, and the blue LED 212 has its own set of lens arrays and a condenser. The red LED 210 projects a light signal that is collimated by the collimator 220, which generates a collimated beam to a first lens array 510 and a second lens array 520. The second lens array 520 transmits light signals to a condenser 530 for focusing the light signal to the X-prism color combiner 230. The green LED 211 projects a light signal that is collimated by the collimator 221, which generates a collimated beam to a third lens array 540 and a fourth lens array 550. The second lens array 550 transmits light signals to a condenser 560 for focusing the light signal to the X-prism color combiner 230. The blue LED 212 projects a light signal that is collimated by the collimator 222, which generates a collimated beam to a fifth lens array 570 and a sixth lens array 580. The sixth lens array 580 transmits light signals to a condenser 590 for focusing the light signal to the X-prism color combiner 230. The condenser 530, 560 or 590 can be implemented with a Fresnel lens, which is very thin to conserve space dimensions. The condensers may also be implemented with a first-order or a multi-order diffractive lens. The Fresnel or diffractive condenser lens can be selected for the designs in the other embodiments as well.

Figure 5:
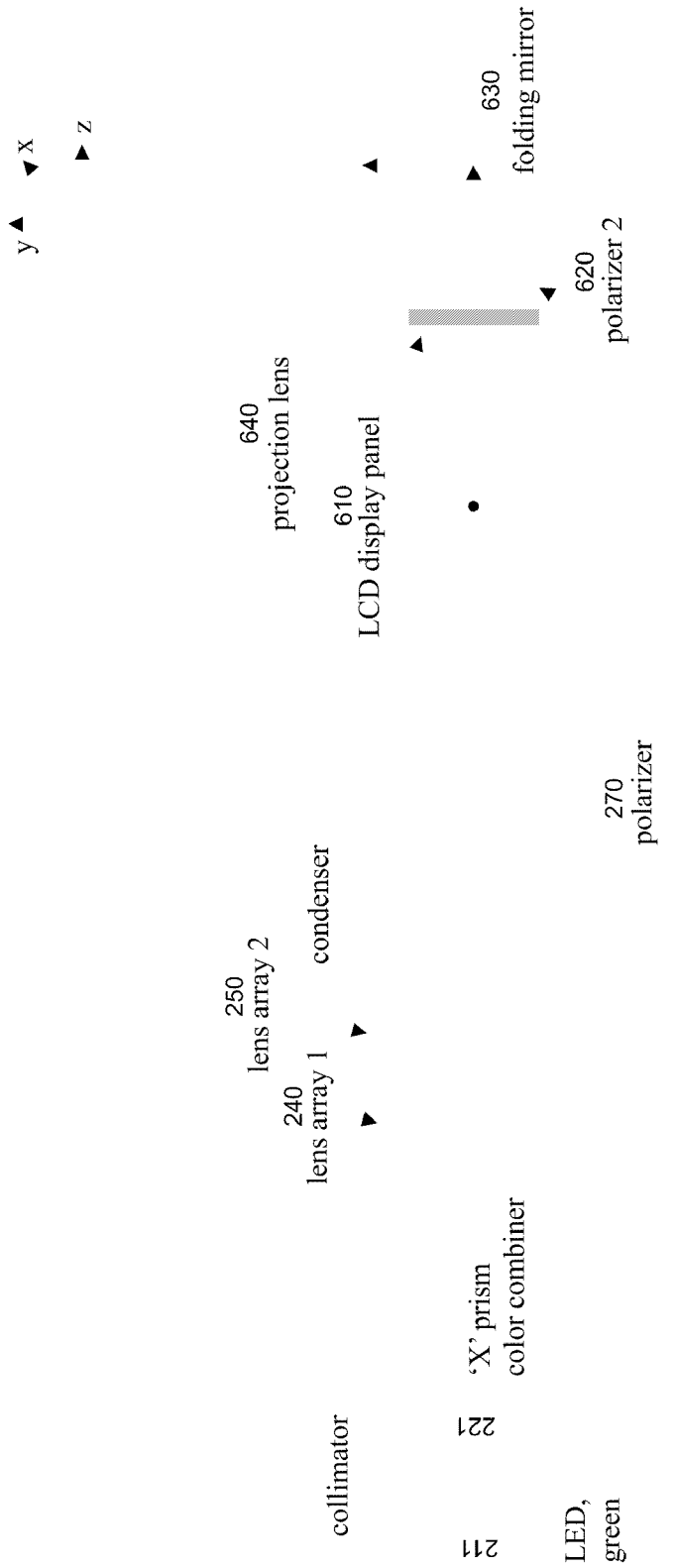
FIG. 5 illustrates a structural diagram in a fifth embodiment of a handheld projection system employing a transmissive LCD display panel in accordance with the present invention.

As shown in FIG. 5, there is a structural diagram in a fifth embodiment of a handheld projection system 500 employing a transmissive LCD display panel. The polarizer 270 is inserted at the same location as the second embodiment, which is located after the condenser 260 to provide polarized illumination to a LCD display panel 610. A second polarizer 620 is positioned behind the LCD display plan 610 to convert polarization modulation into intensity modulation. A folding mirror 630 receiving a light signal from the second polarizer 620 and directs the light signal into a projection lens 640. In an alternative embodiment, the folding mirror 630 is omitted and the projection lens 640 is placed directly after the second polarizer 620.

Although the present invention illustrated above describes LCOS and LCD display panels, other types of displays, such as digital light processing (DLP) displays, transmissive LCOS displays, diffractive (Micro-Electro-Mechanical Systems) MEMS displays, and Fabry-Perot MEMS displays, can be practiced without departing from the spirits of the present invention. In addition, other display panels that exhibit characteristics that are similar to LCOS microdisplays can also be selected for use with the present invention. A LCOS display panel possesses the characteristics that includes high aperture ratio (the ratio between an optical-active area and the total area of a pixel) because a control circuitry is hidden behind the active area, as well as a fast response time attributed to a thinner liquid crystal layer in the reflective configuration.

The handheld projection systems 100, 400, 500 and 600 illustrated all require polarized illumination. One suitable approach to convert a non-polarized source signal into polarized illumination is to use a Polarization Conversion System (PCS) 710. A polarization conversion system is a set of polarization beam splitter and wave plates, as illustrated in FIG. 7A. A polarization conversion array 720 includes a plurality of polarization conversion systems. The polarization conversion array 720 can be inserted just after the second lens array 150 in the first embodiment, the second lens array 150 in the third embodiment, the second lens arrays 530, 560 and 590 in the fourth embodiment, or the second lens array 250 in the fifth embodiment. In order for the PCS to function properly, the beam projected from a collimator should be relatively well collimated.

Figure 8:
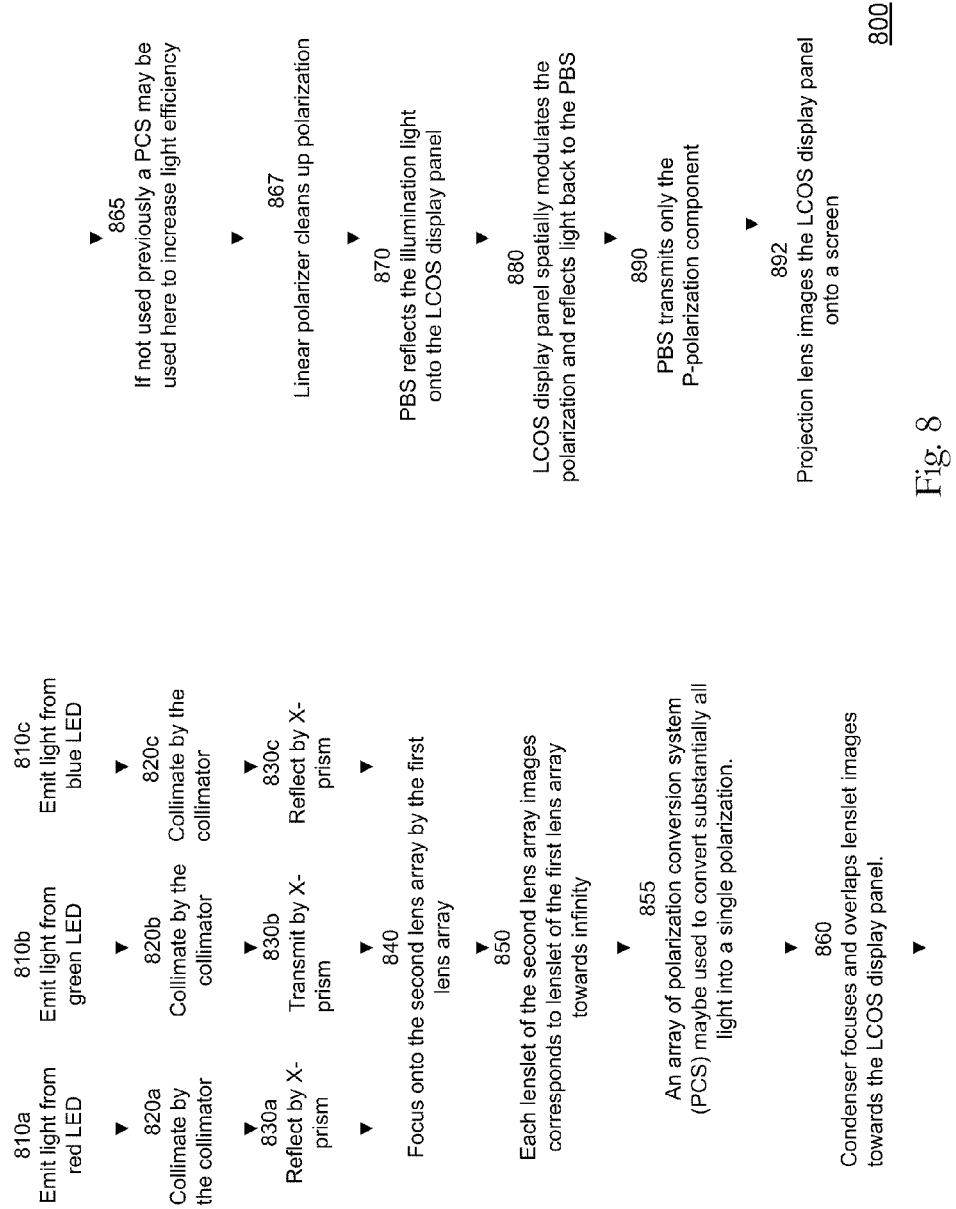
FIG. 8 illustrates a flow chart of the process in the emission of color light signals to project lens images of a LCOS panel onto a screen with respect to the first embodiments in accordance with the present invention.

Turning now to FIG. 8, there is a flow chart illustrating the process 800 in the emission of light signals to project lens images of LCOS panel onto a screen with respect to the first embodiment as shown in FIG. 1A and FIG. 1B. At steps 820a, 820b, and 820c respectively, the collimator 220 receives an input light signal 810a emitted from the red LED 210, the collimator 120 receives an input light signal 810b emitted from the green LED 110, and the collimator 222 receives an input light signal 810c from the blue LED 212. At steps 830a, 830b, and 830c respectively, the X-prism color combiner 130 reflects the red light signal 810a, transmits the green light signal 810b, and reflects the blue light signal 810c. At step 840, the first lens array 140 having the plurality of lenslets that focuses light to the lenslets in the second lens array 150. At step 850, each lenslet in the second lens array 150 images its corresponding lenslet in the first lens array 140 toward infinity.

Optionally at step 855, the array polarization conversion system 720 may be used to covert substantially all light signals into a single polarization. The condenser 160 focuses and overlaps lenslet images toward the LCOS display panel 190 at step 860. The polarization conversion system 810 may be used as an optional step at step 865 to increase light efficiency if the polarization conversion system 720 was not used previously. Another optional process at step 867 is to use the linear polarizer 170 to clean up the polarization of the light signals from the condenser 160 before projecting onto the display panel 190. At step 870, the polarization beam splitter 180 reflects the illumination light onto the display panel 190. At step 880, the display panel 190 spatially modulates the polarization and reflects light signals back to the polarization beam splitter 180. The polarization beam splitter 180 transmits, in this embodiment, only the P-polarization component of the light signals at step 990. At step 892, the projection lens 195 projects images from the LCOS display panel onto a screen.

Figure 9:
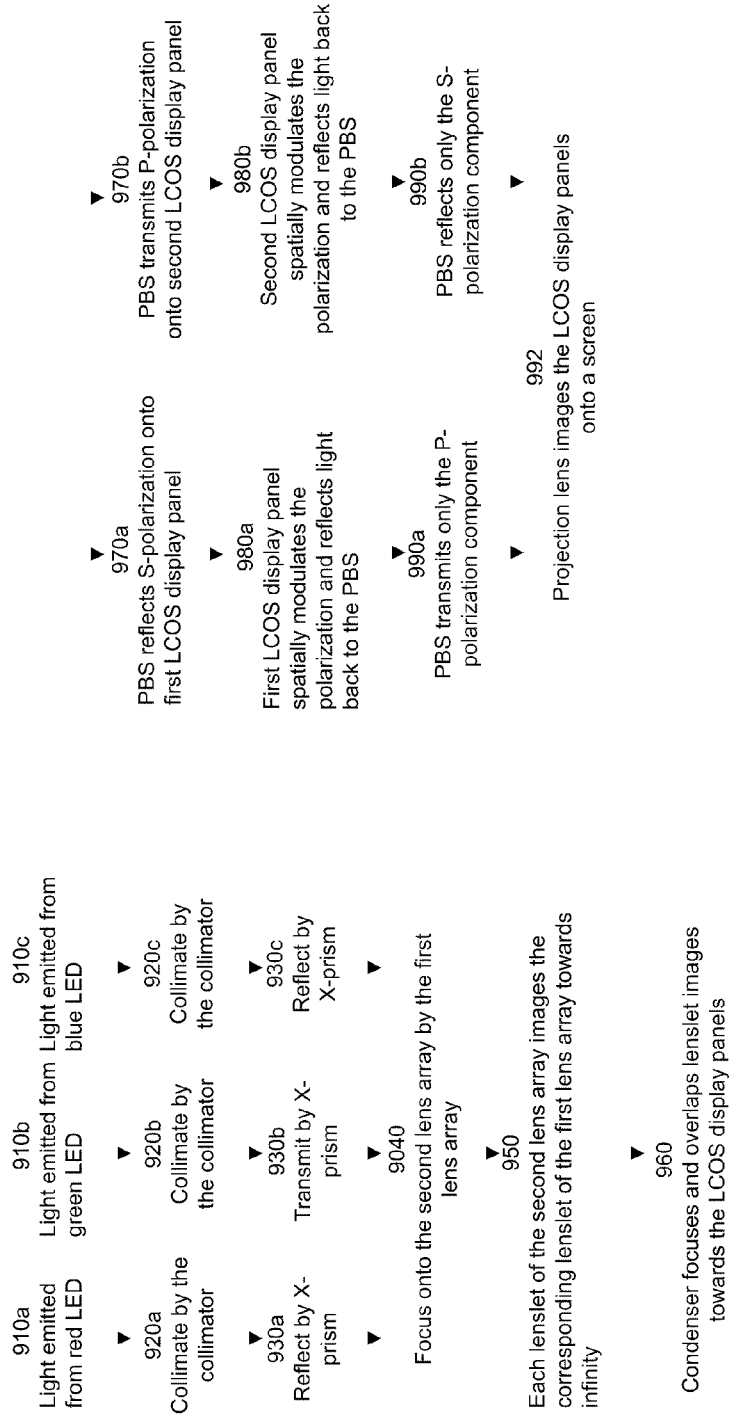
FIG. 9 illustrates a flow chart of the process in the emission of color light signals to project lens images of a LCOS panel onto a screen with respect to the second embodiment in accordance with the present invention.

As shown in FIG. 9, there is a flow chart illustrating the process 900 in the emission of light signals to project lens images of LCOS panel onto a screen with respect to the second embodiment as shown in FIG. 2. In the process 900, three prime color inputs are described, similar to the first embodiment. At steps 920a, 920b, and 920c respectively, the collimator 220 receives an input light signal 910a emitted from the red LED 210, the collimator 110 receives an input light signal 910b emitted from the green LED 120, and the collimator 222 receives an input light signal 910c from the blue LED 212. At steps 930a, 930b, and 930c respectively, the X-prism color combiner 130 reflects the red light signal 910a, transmits the green light signal 910b, and reflects the blue light signal 910c. At step 940, the first lens array 140 having the plurality of lenslets that focuses to the lenslets in the second lens array 150. At step 950, each lenslet in the second lens array 150 images the corresponding lenslet in the first lens array 140 toward infinity. The condenser 160 focuses and overlaps lenslet images toward the LCOS display panels 190 and 310 at step 960.

With a pair of LCOS display panels 190 and 310, the polarization beam splitter 180 reflects the S-polarization onto the first LCOS display panel 190 at step 970a, and transmits the P-polarization onto the second LCOS display panel 310 at step 970b. At step 980a, the first LCOS display panel 190 spatially modulates the polarization and reflects light signals back to the polarization beam splitter 180, while at step 980b, the second LCOS display panel 310 spatially modulates the polarization and reflects light signals back to the polarization beam splitter 180. The polarization beam splitter 180 transmits the P-polarization component of the light signals at step 990a, and reflects the S-polarization component of the light signals at step 990b. At step 992, the projection lens 195 projects images from the LCOS display panels 190 and 310 onto a screen.

Figure 10:
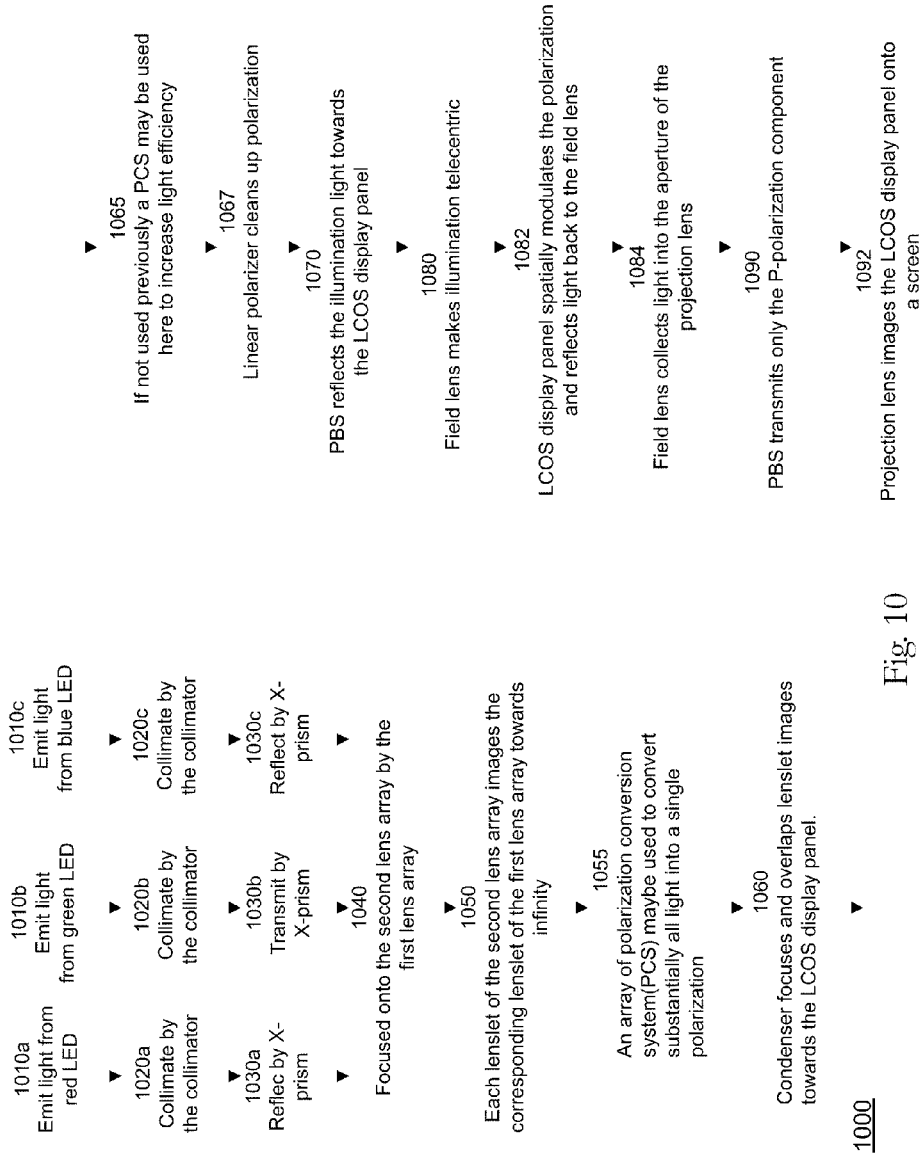
FIG. 10 illustrates a flow chart of the process in the emission of color light signals to project lens images of a LCOS panel onto a screen with respect to the third embodiment in accordance with the present invention.

In FIG. 10, there a flow chart illustrating the process 1000 in the emission of light signals to project lens images of LCOS panel onto a screen with respect to the third embodiment as shown in FIG. 3. At steps 1020a, 1020b, and 1020c respectively, the collimator 220 receives an input light signal 1010a emitted from the red LED 210, the collimator 120 receives an input light signal 1010b emitted from the green LED 110, and the collimator 222 receives an input light signal 1010c from the blue LED 212. At steps 1030a, 1030b, and 1030c respectively, the X-prism color combiner 230 reflects the red light signal 1010a, transmits the green light signal 1010b, and reflects the blue light signal 1010c. At step 1040, the first lens array 140 having the plurality of lenslets that focuses light to the lenslets in the second lens array 150. At step 1050, each lenslet in the second lens array 150 images the corresponding lenslet in the first lens array 140 toward infinity.

Optionally at step 1055, the array polarization conversion system 820 may be used to covert substantially all light into a single polarization. The condenser 160 focuses and overlaps lenslet images toward the LCOS display panel 190 at step 960. The polarization conversion system 810 may be used as an optional step at step 1065 to increase light efficient if the polarization conversion system 820 was not used previously. Another optional process at step 1067 is to use the linear polarizer 170 to clean up the polarization of the light signals from the condenser 160 before projecting onto the LCOS display panel 190. At step 1070, the polarization beam splitter 180 reflects the illumination light onto the LCOS display panel 190. At step 1080, the field lens 410 makes the illumination telecentric. At step 1082, the LCOS display panel 190 spatially modulates the polarization and reflects light signals back to the polarization beam splitter 180. At step 1084, the field lens 410 collects light signals into the aperture of the projection lens 195. The polarization beam splitter 180 transmits, in this embodiment, only the P-polarization component of the light signals at step 1090. At step 1092, the projection lens 195 projects images from the LCOS display panel onto a screen.

Figure 11:
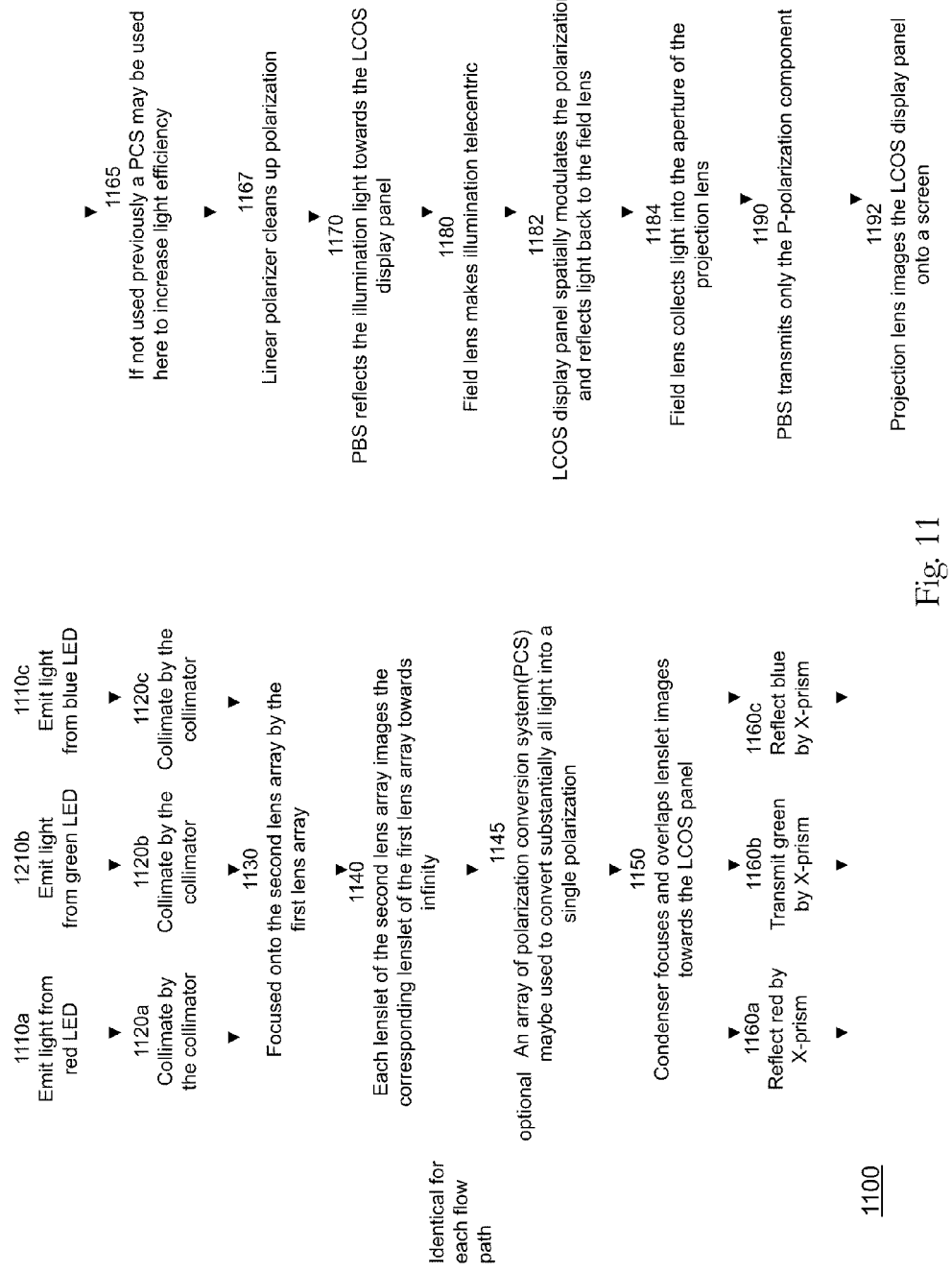
FIG. 11 illustrates a flow chart of the process in the emission of color light signals to project lens images of a LCOS panel onto a screen with respect to the fourth embodiment in accordance with the present invention.

FIG. 11 illustrates a flow chart of the process 1100 in the emission of light signals to project lens images of LCOS panel onto a screen with respect to the fourth embodiment as shown in FIG. 4. At steps 1120a, 1120b, and 1120c respectively, the collimator 220 receives an input light signal 1110a emitted from the red LED 210, the collimator 221 receives an input light signal 1110b emitted from the green LED 211, and the collimator 222 receives an input light signal 1110c from the blue LED 212. Steps 1130, 1140, 1145, and 1150 represent a flow path for one color signal, e.g. the light signal emitted from the red LED 210. An identical flow path is applicable for each of the other colors such as the light signal emitted from the green LED 211 and the light signal emitted form the blue LED 221.

At step 1130, the first lens array 510 has a plurality of lenslets that focuses light to a plurality of lenslets in the second lens array 520. At step 1140, each lenslet in the second lens array 520 images the corresponding lenslet in the first lens array 510 toward infinity. Optionally at step 1145, the array polarization conversion system 820 may be used to covert substantially all light into a single polarization. The condenser 530 focuses and overlaps lenslet images toward the LCOS display panel 290 at step 1150.

At steps 1160a, 1160b, and 1160c respectively, the X-prism color combiner 230 reflects the red light signal 1110a, transmits the green light signal 1110b, and reflects the blue light signal 1110c. The polarization conversion system 810 may be used as an optional step at step 1165 to increase light efficiency if the polarization conversion system 820 was not used previously. Another optional process at step 1167 is to use the linear polarizer 270 to clean up the polarization of the light signals from the condenser 530 before projecting onto the LCOS display panel 290. At step 1170, the polarization beam splitter 280 reflects the illumination light onto the LCOS display panel 290. At step 1180, the field lens 410 makes the illumination telecentric. At step 1182, the LCOS display panel 290 spatially modulates the polarization and reflects light signals back to the field lens 410. At step 1184, the field lens 410 collects light signals into the aperture of the projection lens 195. The polarization beam splitter 280 transmits, in this embodiment, only the P-polarization component of the light signals at step 1190. At step 1192, the projection lens 195 projects images from the LCOS display panel onto a screen.

Figure 12:
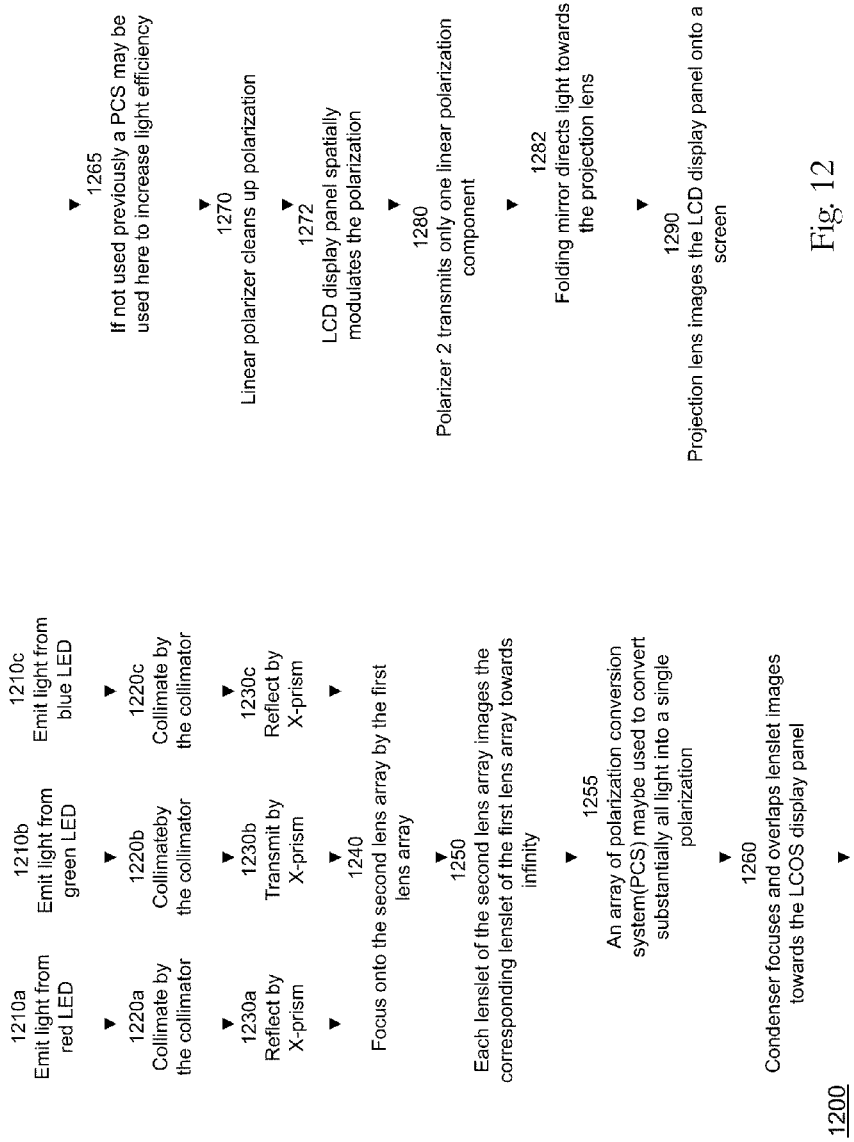
FIG. 12 illustrates a flow chart of the process in the emission of color light signals to project lens images of a LCOS panel onto a screen with respect to the fifth embodiment in accordance with the present invention.
Figure 1A:
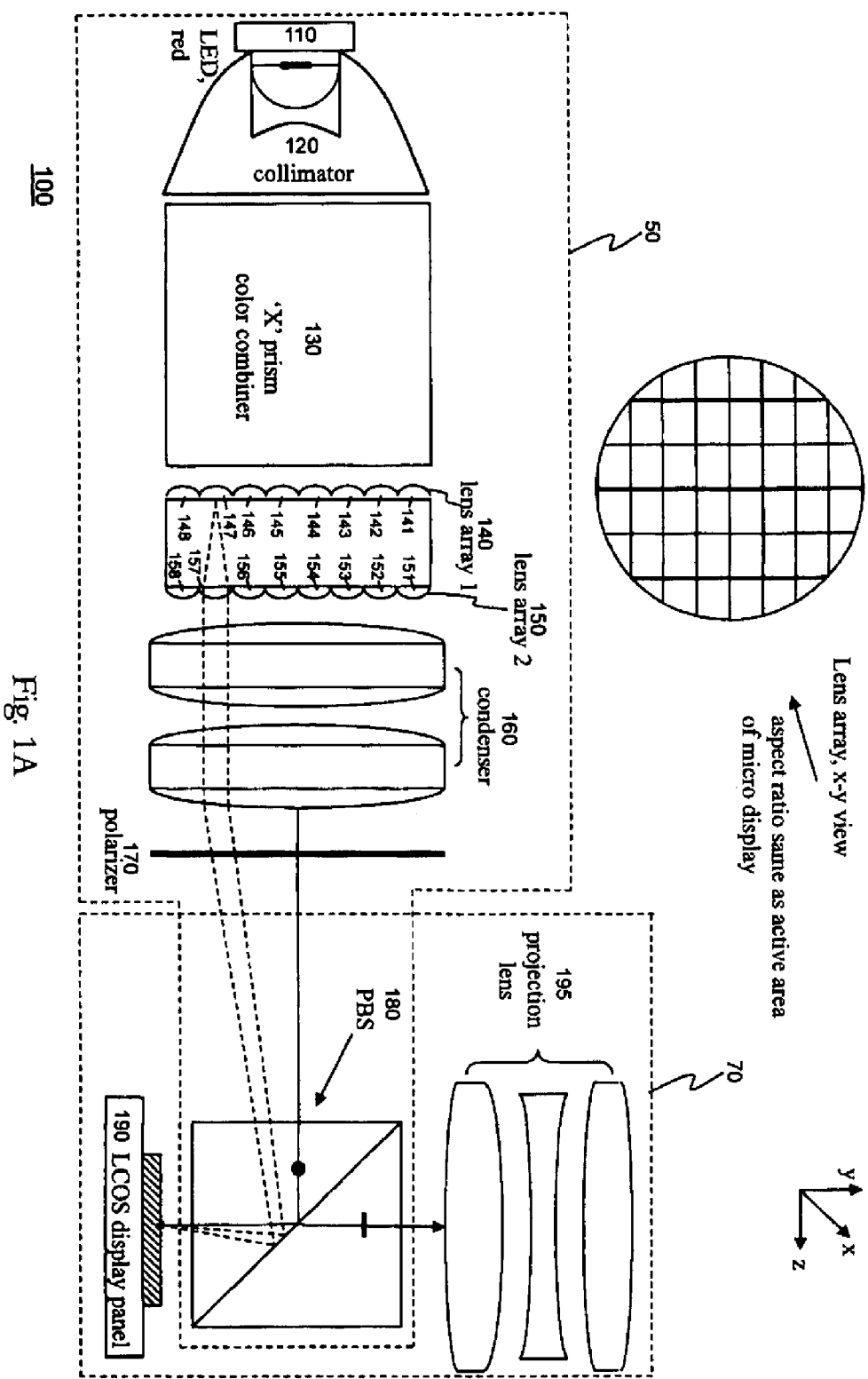
Figure 1B:
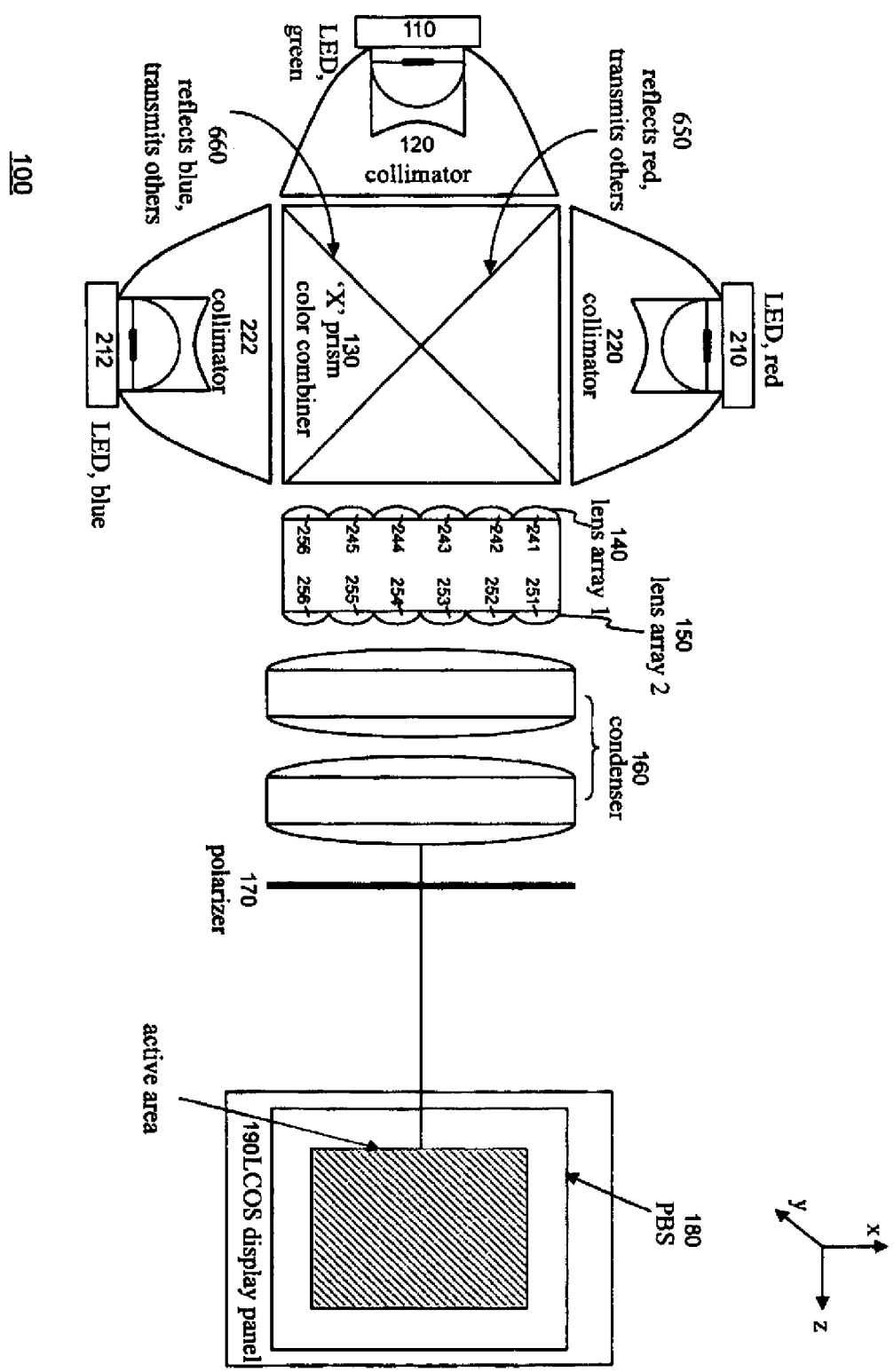
Figure 2:
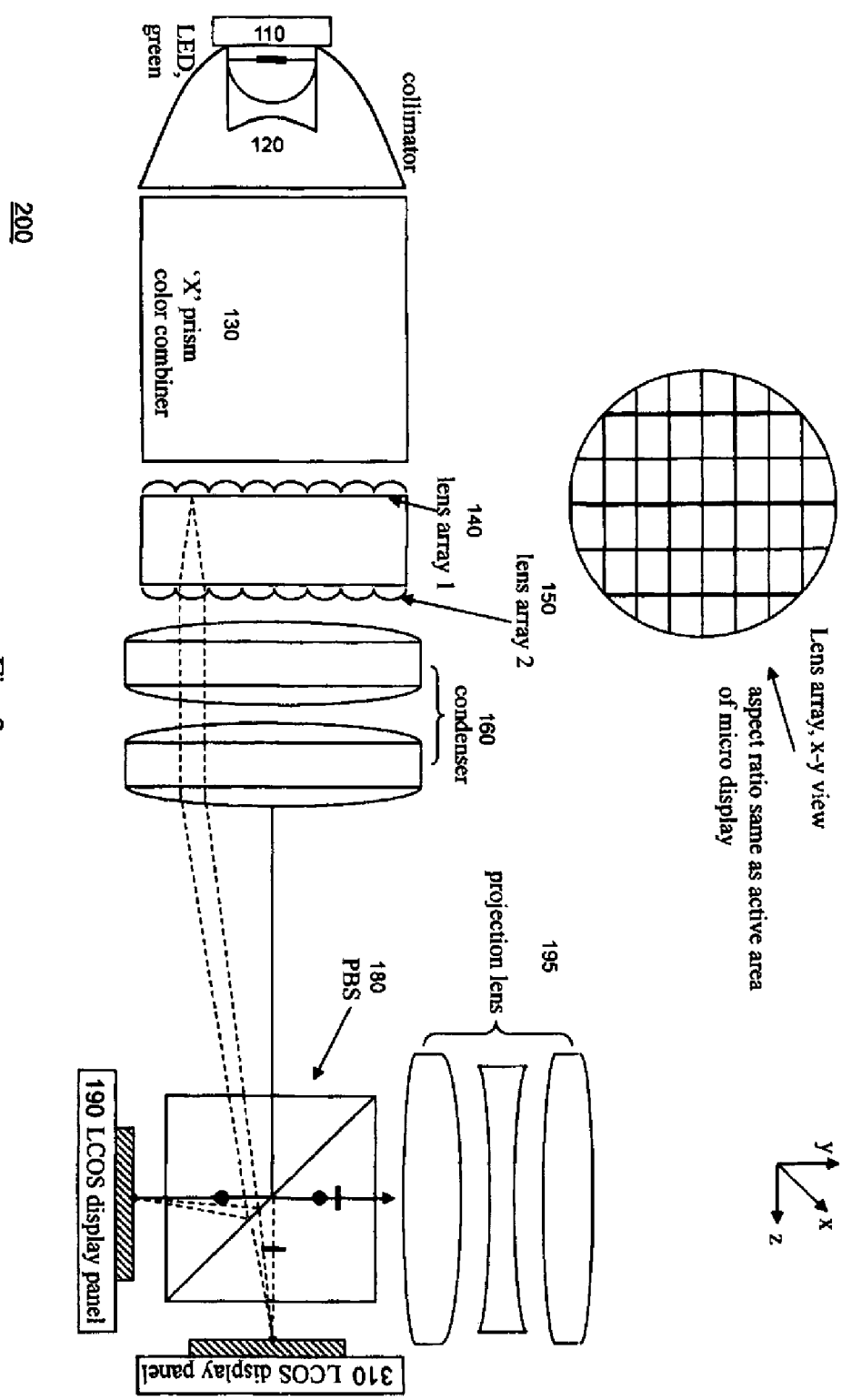
Figure 3:
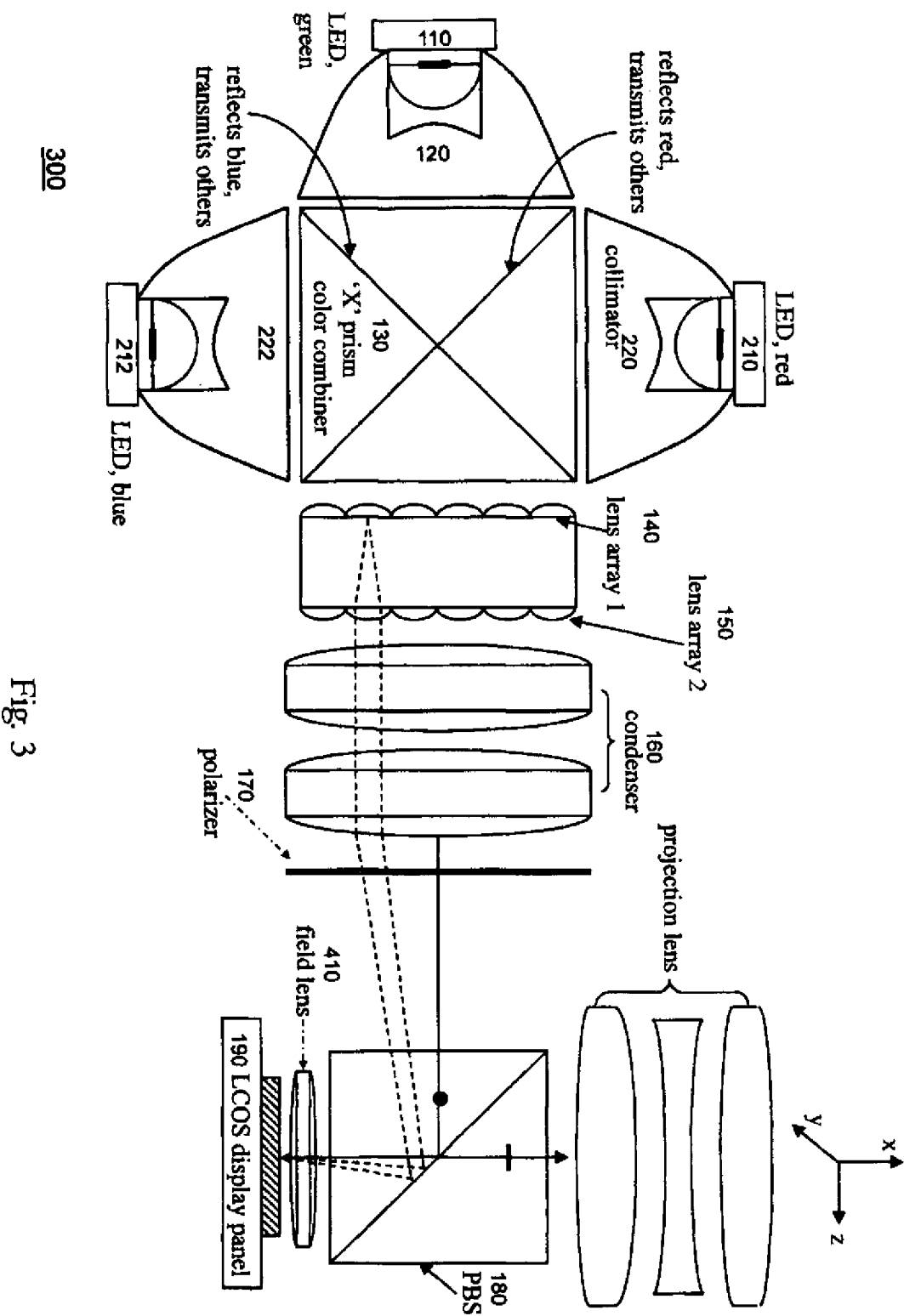
Figure 4:
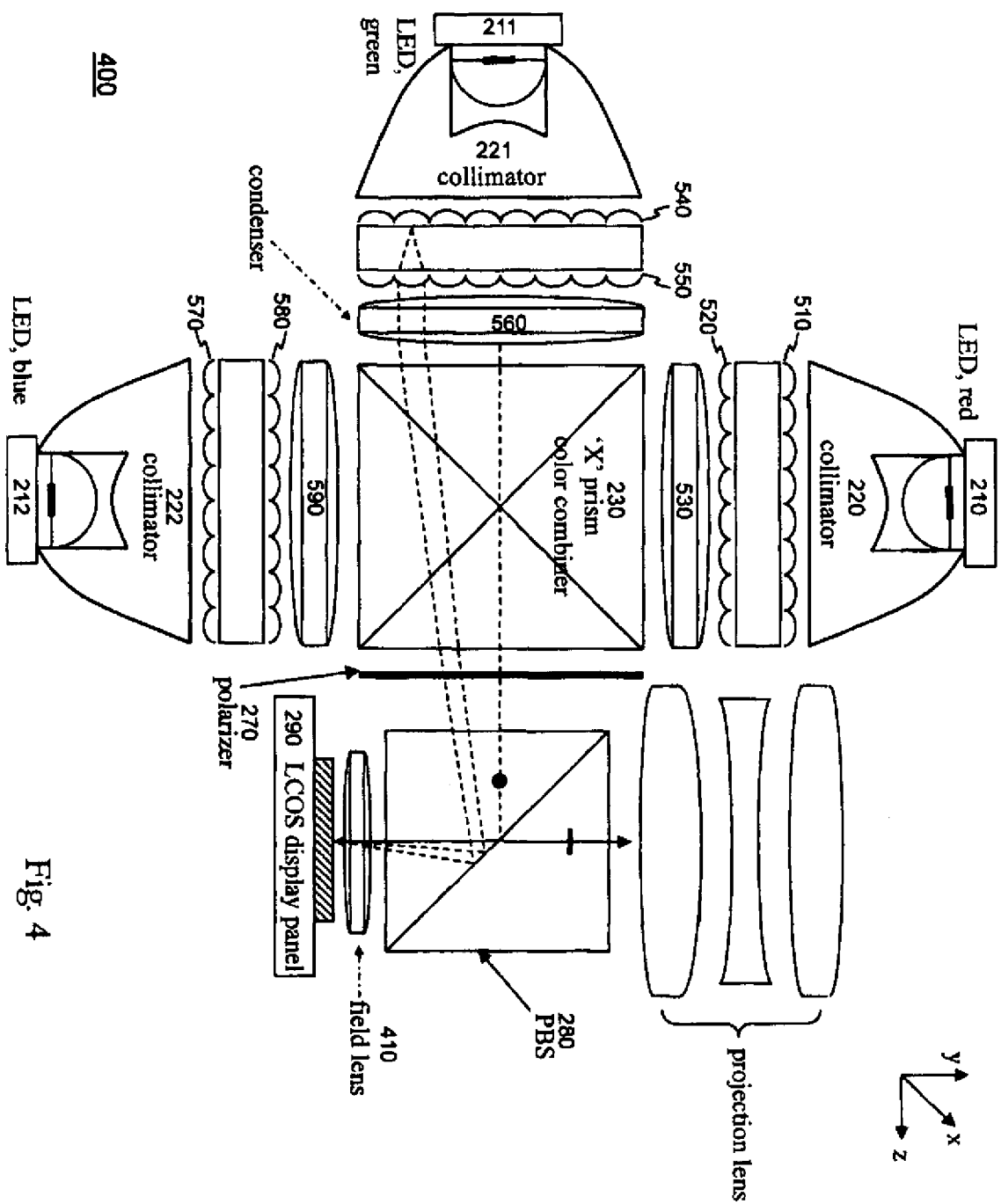
Figure 5:
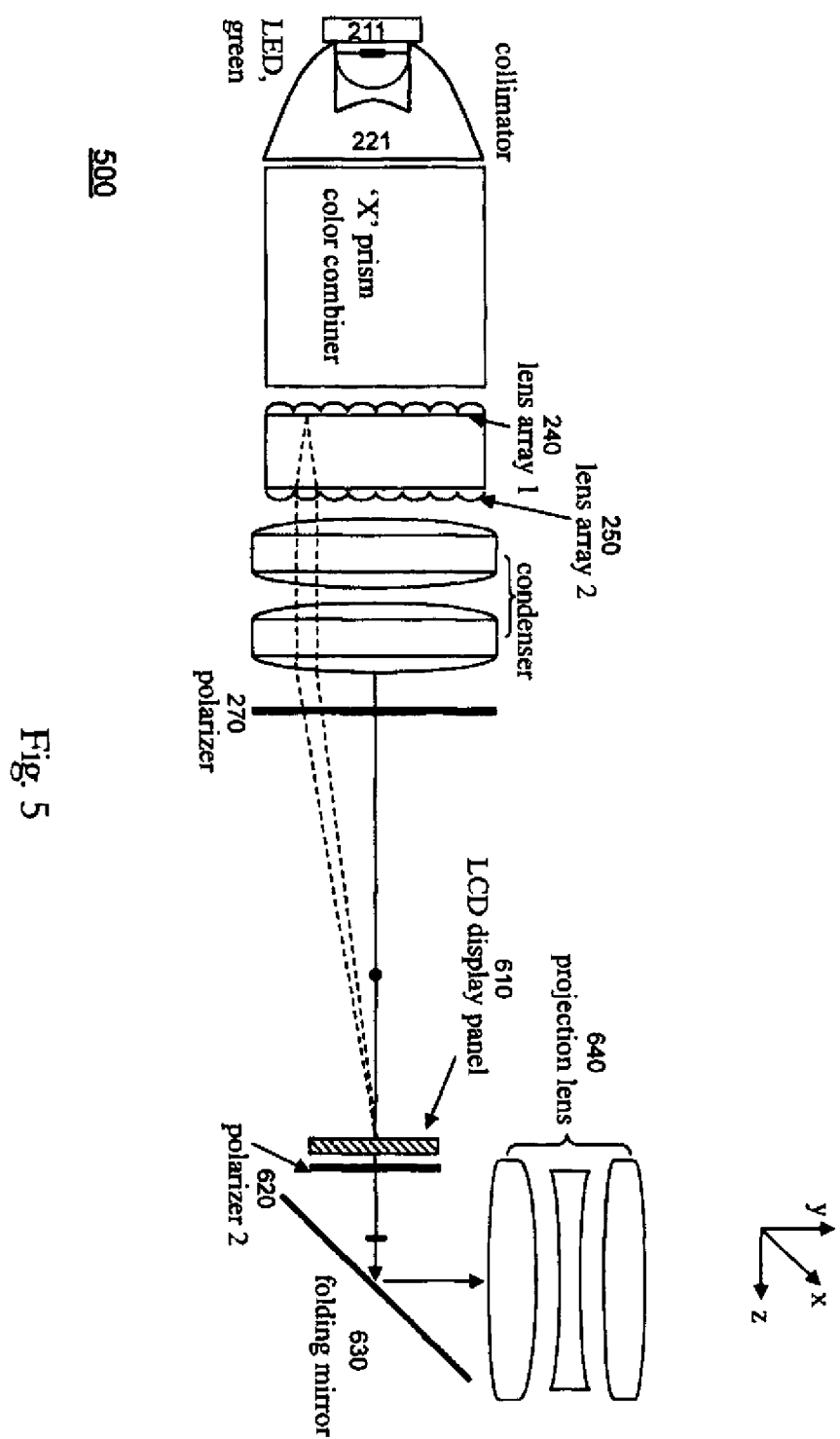

FIG. 12 illustrates a flow chart of the process 1200 in the emission of light signals to project lens images of LCOS panel onto a screen with respect to the fifth embodiment as shown in FIG. 5. In the process 1200, three prime color inputs are described, similar to the first embodiment. At steps 1220a, 1220b, and 1220c respectively, the collimator 220 receives an input light signal 1210a emitted from the red LED 210, the collimator 221 receives an input light signal 1210b emitted from the green LED 211, and the collimator 222 receives an input light signal 1210c from the blue LED 212. At steps 1230a, 1230b, and 1230c respectively, the X-prism color combiner 230 reflects the red light signal 1210a, transmits the green light signal 1210b, and reflects the blue light signal 1210c. At step 1240, the first lens array 240 having a plurality of lenslets that focuses light to the lenslets in the second lens array 250. At step 1250, each lenslet in the second lens array 250 images the corresponding lenslet in the first lens array 240 toward infinity.

Optionally at step 1255, the array polarization conversion system 820 may be used to covert substantially all light into a single polarization. The condenser 260 focuses and overlaps lenslet images toward the LCOS display panel 290 at step 1260. The polarization conversion system 810 may be used as an optional step at step 1265 to increase light efficient if the array polarization conversion system 820 was not used previously. Another optional process at step 1270 is to use the linear polarizer 270 to clean up the polarization of the light signals from the condenser 260 before projecting onto the LCD display panel 610. At step 1272, the LCD display panel 610 spatially modulates the polarization. At step 1280, the second polarizer 620 transmits just one linear polarization component. As an optional step at step 1282, the folding mirror 630 directs the light signal towards the projection lens 640. At step 1290, the projection lens 640 images the LCD display panel 610 onto a screen.

The handheld projection displays in the present invention are applicable to a wide variety of handheld or hybrid handheld devices, including but not limited to pagers, cell phones, PDAs, DVS players, music players, video players, camcorders, game devices, electronic wallets and any future miniature devices whether they are sufficiently small to be placed in a hand or for placement on a table. The connection between the handheld projection displays and a handheld device can be electrically coupled through such common standards as NTSC, PAL, VGA, DVI, USB, FireWire, or wireless connections including Wi-Fi, Wi-Max, bluetooth and others.

The invention has been described with reference to specific exemplary embodiments. Various modifications, adaptations, and changes may be made without departing from the spirit and scope of the invention. Accordingly, the specification and drawings are to be regarded as illustrative of the principles of this invention rather than restrictive, the invention is defined by the following appended claims.

I claim:

1. A handheld display system, comprising:
   one or more light sources for generating one or more color light signals;
   a first lens array having a plurality of lenslets;
   a second lens arrays having a plurality of lenslets, the second lens array spaced apart from the first lens array by one focal length between the plurality of lenslets of the second lens array and the plurality of lenslets of the first lens array; and
   a display panel for spatially modulating the one or more color light signals to a projection lens that projects an image onto a screen;
   wherein each lenslet in the first and second lens arrays comprises a width that is equal to a width of the display panel multiply by a focal length of the lenslet divided by a focal length of the condenser, and each lenslet in the first and second arrays comprises a height that is equal to a height of the display panel multiply by the focal length of the lenslet divided by the focal length of the condenser.

2. The handheld display system of claim 1 further comprising one or more collimators for collimating a respective one of the one or more color light signals.

3. The handheld display system of claim 2 wherein each lenslet in the plurality of lenslets in the first lens array focuses substantially all light onto a corresponding lenslet in the plurality of lenslets in the second array.

4. The handheld display system of claim 3 wherein each collimator comprises a tangent of a half angle θ of a diverging cone exiting from the collimator that is less than or equal to the value of 0.5 divided by a F-number of the lenslet, represented mathematically as $\tan(\theta) \leq 0.5/F\#_{lenslet}$.

5. The handheld display system of claim 2 further comprising a X-prism color combiner that includes a high-pass filter and a low-pass filter, the X-prism reflecting a first color light signal, transmitting a second color light signal, and reflecting a third color light signal.

6. The handheld display system of claim 5 further comprising a condenser for focusing and overlapping color light signals from the plurality of lenslets of the second lens array.

7. The handheld display system of claim 6 wherein the condenser has a focal length that is divided by a width of the light beam at the lens array which is greater than or equal to the F-number of the display panel.

8. The handheld display system of claim 6 wherein the condenser has a focal length that is divided by a height of the light beam at the lens array which is greater than or equal to the F-number of the display panel.

9. The handheld display system of claim 6 further comprising a first polarizer for converting one or more color light signals from the plurality of lenslets of the second lens array into a linear polarization signal before transmitting to the condenser.

10. The handheld display system of claim 9 further comprising a second polarizer for cleaning the linear polarization signal.

11. The handheld display system of claim 6 further comprising a polarization beam splitter that reflects the illumination of one or more color light signals onto the display panel.

12. The handheld display system of claim 11 wherein the display panel spatially modulates the one or more color light signals back to the polarization beam splitter.

13. The handheld display system of claim 12 wherein the polarization beam splitter transmitting a P-polarization component of the polarized light signal to the projection lens.

14. The handheld display system of claim 6 further comprising a polarization beam splitter receives an overlapping lenslet images from the condenser, the polarization beam splitter reflecting a S-polarization onto a first LCOS panel, and transmitting a P-polarization onto a second LCOS display panel.

15. The handheld display system of claim 1 wherein the display panel comprises a LCOS display panel.

16. The handheld display system of claim 1 wherein the display panel comprises a DLP display panel.

17. The handheld display system of claim 1 wherein the display panel comprises a MEMS display panel.

18. The handheld display system of claim 1 wherein the first plurality of lenslets of the first lens array are refractive or diffractive.

19. The handheld display system of claim 1 wherein the first plurality of lenslets of the second lens array are refractive or diffractive.

20. The handheld display system of claim 1 wherein the first plurality of lenslets of the first lens array and the second plurality of lenslets of the second lens array comprise a combination of refractive and diffractive lenslets.

21. A method for generating a handheld projection display, comprising:
    emitting one or more color light signals from one or more light sources;
    collimating the one or more color light signals with an X-prism by reflecting a first color light signal, transmitting a second color signal, and reflecting a third color signal;
    corresponding each one of a plurality of lenslets in a second lens array with each one of a plurality of lenslets in a first lens array toward infinity, the second lens array spaced apart from the first lens array by one focal length between the plurality of lenslets of the second lens array and the plurality of lenslets of the first lens array, each lenslet in the first and second lens arrays having a width that is equal to a width of the display panel multiply by a focal length of the lenslet divided by a focal length of the condenser, each lenslet in the first and second arrays having a height that is equal to a height of the display panel multiply by the focal length of the lenslet divided by the focal length of the condenser; and
    projecting images from a display panel onto a screen.

22. The method of claim 21 wherein in the corresponding step comprises focusing substantially all light from each lenslet in the plurality of lenslets in the first lens array onto a corresponding lenslet in the plurality of lenslets in the second array.

23. The method of claim 22 wherein each collimated color light signal comprises a tangent of a half angle θ of a diverging cone exiting from a collimator that is less than or equal to the value of 0.5 divided by a F-number of the lenslet, represented mathematically as $\tan(\theta) \leq 0.5/F\#_{lenslet}$.

24. The method of claim 21 focusing and overlapping color light signals from the plurality of lenslets of the second lens array with a condenser.

25. The method of claim 24 wherein the condenser has a focal length that is divided by a width of the light beam at the lens array which is greater than or equal to the F-number of the display panel.

26. The method of claim 24 wherein the condenser has a focal length that is divided by a height of the light beam at the lens array which is greater than or equal to the F-number of the display panel.

27. The method of claim 24 further comprising converting one or more color light signals from the plurality of lenslets of the second lens array into a linear polarization signal before transmitting to the condenser.

28. The method of claim 27 further comprising cleaning the linear polarization signal.

29. The method of claim 28 further comprising reflecting the illumination of one or more color light signals onto the display panel with a polarization beam splitter.

30. The method of claim 29 modulating spatially the one or more color light signals back to the polarization beam splitter.

31. The method of claim 30 transmitting a P-polarization component of the polarized light signal to the projection lens by the polarization beam splitter.

32. The method of claim 31 receiving an overlapping lenslet images from the condenser by a polarization beam splitter, the polarization beam splitter reflecting a S-polarization onto a first LCOS panel and transmitting a P-polarization onto a second LCOS display panel.

33. The handheld display system of claim 21 wherein the display panel comprises a LCOS display panel.

34. The handheld display system of claim 21 wherein the display panel comprises a LCD display panel.

35. A handheld display system, comprising:
one or more light sources for generating a first color signal, a second color signal, and a third color signal;
a first lens array having a plurality of lenslets;
an X-prism color combiner, positioned between one or more light sources and the first lens array, having a high-pass filter and a low-pass filter, the X-prism transmitting the second color light signal to the first lens array, and reflecting the third color light signal to the first lens array;
a second lens arrays having a plurality of lenslets, the second lens array spaced apart from the first lens array by one focal length between the plurality of lenslets of the second lens array and the plurality of lenslets of the first lens array; and
a display panel for spatially modulating the one or more color light signals to a projection lens that projects an image onto a screen.

* * * * *

UNITED STATES PATENT AND TRADEMARK OFFICE
CERTIFICATE OF CORRECTION

| | | |
|---|---|---|
| PATENT NO. | : 7,604,355 B1 | Page 1 of 17 |
| APPLICATION NO. | : 11/302044 | |
| DATED | : October 20, 2009 | |
| INVENTOR(S) | : Peng | |

It is certified that error appears in the above-identified patent and that said Letters Patent is hereby corrected as shown below:

The title page, showing an illustrative figure, should be deleted and substitute therefor the attached title page.

Delete drawing sheets 1-15 and substitute therefor the drawing sheets, consisting of figures 1-12 as shown on the attached pages.

Signed and Sealed this

Twenty-second Day of December, 2009

David J. Kappos
*Director of the United States Patent and Trademark Office*

(12) United States Patent
Peng

(10) Patent No.: US 7,604,355 B1
(45) Date of Patent: Oct. 20, 2009

(54) SYSTEMS AND METHODS FOR HANDHELD PROJECTION DISPLAYS

(75) Inventor: Song Peng, Pleasanton, CA (US)

(73) Assignee: PhotonEdge Inc., Pleasanton, CA (US)

(*) Notice: Subject to any disclaimer, the term of this patent is extended or adjusted under 35 U.S.C. 154(b) by 413 days.

(21) Appl. No.: 11/302,044

(22) Filed: Dec. 13, 2005

Related U.S. Application Data

(60) Provisional application No. 60/635,050, filed on Dec. 13, 2004.

(51) Int. Cl.
G03B 29/00 (2006.01)
G03B 21/20 (2006.01)
G03B 21/14 (2006.01)
G03B 21/28 (2006.01)
H04N 5/74 (2006.01)
G02F 1/135 (2006.01)
G02F 1/1335 (2006.01)
G02B 7/28 (2006.01)

(52) U.S. Cl. ............... 353/43; 353/32; 353/102; 353/84; 353/81; 348/771; 349/30; 349/62; 349/57; 396/113

(58) Field of Classification Search ............... 353/32, 353/43, 42, 102, 84, 81; 348/800–801, 771; 349/61, 62, 69, 57, 30; 396/113
See application file for complete search history.

(56) References Cited

U.S. PATENT DOCUMENTS

| | | | | |
|---|---|---|---|---|
| 6,227,669 | B1 * | 5/2001 | Tiao et al. | 353/31 |
| 6,478,429 | B1 * | 11/2002 | Aritake et al. | 353/31 |
| 6,533,420 | B1 * | 3/2003 | Eichenlaub | 353/7 |
| 6,637,892 | B1 * | 10/2003 | Okuyama et al. | 353/38 |
| 6,896,375 | B2 * | 5/2005 | Peterson et al. | 353/66 |
| 7,216,986 | B2 * | 5/2007 | Ikeda et al. | 353/33 |
| 2004/0070841 | A1 * | 4/2004 | Bierhuizen | 359/641 |
| 2004/0156130 | A1 * | 8/2004 | Powell et al. | 359/845 |

* cited by examiner

Primary Examiner—Diane I Lee
Assistant Examiner—Magda Cruz
(74) Attorney, Agent, or Firm—Intellectual Equity; Peter Su

(57) ABSTRACT

Systems and methods are described employing a first lens array and a second lens array that are separated by one focal length that receives a plurality of colors signals from an X-prism and transmits to a condenser for overlapping lenslet images onto a display panel, such as a LCOS or LCD display panel. The first lens array includes a plurality of lenslets where each lenslet in the first lens array corresponds with each lenslet in a plurality of lenslets in the second lens array. The lenslets can be either refractive, defractive, or a combination of refractive and defractive.

35 Claims, 15 Drawing Sheets

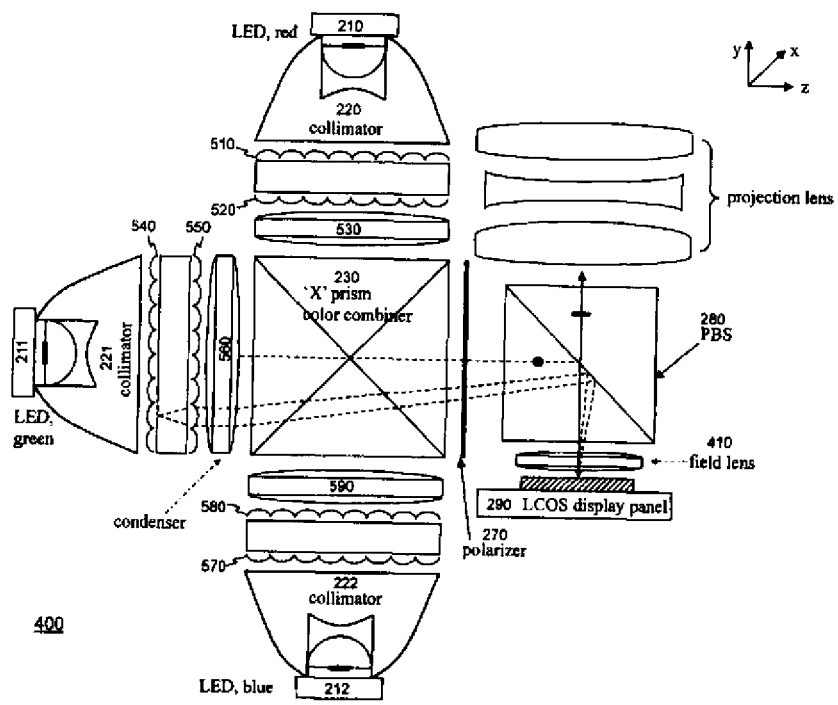

Polarization Conversion System

Polarization Conversion Array